United States Patent
Laufer et al.

(10) Patent No.: US 11,496,171 B1
(45) Date of Patent: Nov. 8, 2022

(54) MULTI-STAGE SIGNAL RECONSTRUCTION

(71) Applicant: QUALCOMM Incorporated, San Diego, CA (US)

(72) Inventors: Yaron Laufer, Givat Shmuel (IL); Gideon Kutz, Ramat Hasharon (IL); Elad Meir, Ramat Gan (IL); Ory Eger, Tel Aviv (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/308,523

(22) Filed: May 5, 2021

(51) Int. Cl.
*H04B 1/12* (2006.01)
*H04B 1/10* (2006.01)
*H04L 27/26* (2006.01)

(52) U.S. Cl.
CPC ........... *H04B 1/123* (2013.01); *H04B 1/1027* (2013.01); *H04L 27/2623* (2013.01)

(58) Field of Classification Search
CPC ............. H04L 27/2623; H04L 27/2614; H04L 27/2647; H04L 27/2649; H04B 1/10; H04B 1/1027; H04B 1/123
See application file for complete search history.

(56) References Cited

U.S. PATENT DOCUMENTS 11,190,383 B2 * 11/2021 Eger .................. H04L 27/2647

* cited by examiner

*Primary Examiner* — Betsy Deppe
(74) *Attorney, Agent, or Firm* — Loza & Loza, LLP

(57) ABSTRACT

Aspects relate to reconstructing a received non-linearly distorted (e.g., clipped) signal. A transmitting device may non-linearly distort a signal to be transmitted (e.g., by clipping peaks of the signal). This non-linear distortion may adversely affect decoding of the signal at a receiving device. To improve decoding performance at the receiving device, the transmitting device provides information regarding some of the non-linear distortion (e.g., information regarding a subset of the peaks that have been clipped) to the receiving device. The receiving device may reconstruct the signal based on this information (e.g., by reconstructing the subset of the peaks and adding the reconstructed peaks to the received clipped signal). In addition, the receiving device estimates the remaining non-linear distortion in the reconstructed signal (e.g., due to clipped peaks that were not indicated in the clipping information) by slicing the reconstructed signal and clipping the sliced signal, and provides a final reconstructed signal.

30 Claims, 15 Drawing Sheets

MULTI-STAGE SIGNAL RECONSTRUCTION

TECHNICAL FIELD

The technology discussed below relates generally to wireless communication and, more particularly, to a multi-stage technique for reconstructing a signal that has been subjected to a non-linear function (e.g., clipping).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of another wireless communication device such as a first base station (e.g., a gNB) and/or access a second cell of a second base station.

A base station may schedule access to a cell to support access by multiple UEs. For example, a base station may allocate different resources (e.g., time domain and frequency domain resources) for different UEs operating within a cell of the base station. A UE may thereby transmit data to the base station via one or more of these allocated resources. In addition, a UE may thereby receive data transmitted by the base station via one or more of these allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a first wireless communication device is disclosed. The method may include receiving a data signal from a second wireless communication device. The data signal is based on a first signal and includes a non-linear distortion. The method may also include receiving an indication of at least part of the non-linear distortion from the second wireless communication device, generating a reconstruction of the at least part of the non-linear distortion based on the indication, combining the data signal and the reconstruction of the at least part of the non-linear distortion to provide a first reconstructed signal, scaling the first reconstructed signal to provide a scaled reconstructed signal, slicing the scaled reconstructed signal to provide a sliced signal, scaling the sliced signal to provide a scaled sliced signal, and applying a non-linear distortion function to the sliced signal to provide a second signal. The method may further include generating an estimate of a non-linear distortion component of the first reconstructed signal based on the second signal, the reconstruction of the at least part of the non-linear distortion, and the scaled sliced signal, and generating a second reconstructed signal based on the estimate of the non-linear distortion component.

In some examples, a first wireless communication device may include a transceiver, a memory, and a processor communicatively coupled to the transceiver and the memory. The processor and the memory may be configured to receive a data signal from a second wireless communication device via the transceiver. The data signal is based on a first signal and includes a non-linear distortion. The processor and the memory may also be configured to receive an indication of at least part of the non-linear distortion from the second wireless communication device via the transceiver, generate a reconstruction of the at least part of the non-linear distortion based on the indication, combine the data signal and the reconstruction of the at least part of the non-linear distortion to provide a first reconstructed signal, scale the first reconstructed signal to provide a scaled reconstructed signal, slice the scaled reconstructed signal to provide a sliced signal, scale the sliced signal to provide a scaled sliced signal, and apply a non-linear distortion function to the sliced signal to provide a second signal. The processor and the memory may further be configured to generate an estimate of a non-linear distortion component of the first reconstructed signal based on the second signal, the reconstruction of the at least part of the non-linear distortion, and the scaled sliced signa, and to generate a second reconstructed signal based on the estimate of the non-linear distortion component.

In some examples, a first wireless communication device may include means for receiving a data signal from a second wireless communication device. The data signal is based on a first signal and includes a non-linear distortion. The first wireless communication device may also include means for receiving an indication of at least part of the non-linear distortion from the second wireless communication device, means for generating a reconstruction of the at least part of the non-linear distortion based on the indication, means for combining the data signal and the reconstruction of the at least part of the non-linear distortion to provide a first reconstructed signal, means for scaling the first reconstructed signal to provide a scaled reconstructed signal, means for slicing the scaled reconstructed signal to provide a sliced signal, means for scaling the sliced signal to provide a scaled sliced signal, and means for applying a non-linear distortion function to the sliced signal to provide a second signal. The first wireless communication device may further include means for generating an estimate of a non-linear distortion component of the first reconstructed signal based on the second signal, the reconstruction of the at least part of the non-linear distortion, and the scaled sliced signal, and means for generating a second reconstructed signal based on the estimate of the non-linear distortion component.

In some examples, an article of manufacture for use by a first wireless communication device includes a non-transitory computer-readable medium having stored therein instructions executable by one or more processors of the first wireless communication device to receive a data signal from a second wireless communication device via the transceiver. The data signal is based on a first signal and includes a non-linear distortion. The computer-readable medium may also have stored therein instructions executable by one or more processors of the first wireless communication device to receive an indication of at least part of the non-linear distortion from the second wireless communication device via the transceiver, generate a reconstruction of the at least part of the non-linear distortion based on the indication, combine the data signal and the reconstruction of the at least part of the non-linear distortion to provide a first reconstructed signal, scale the first reconstructed signal to provide a scaled reconstructed signal, slice the scaled reconstructed signal to provide a sliced signal, scale the sliced signal to provide a scaled sliced signal, and apply a non-linear distortion function to the sliced signal to provide a second signal. The computer-readable medium may further have stored therein instructions executable by one or more processors of the first wireless communication device to generate an estimate of a non-linear distortion component of the first reconstructed signal based on the second signal, the reconstruction of the at least part of the non-linear distortion, and the scaled sliced signal, and to generate a second reconstructed signal based on the estimate of the non-linear distortion component.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
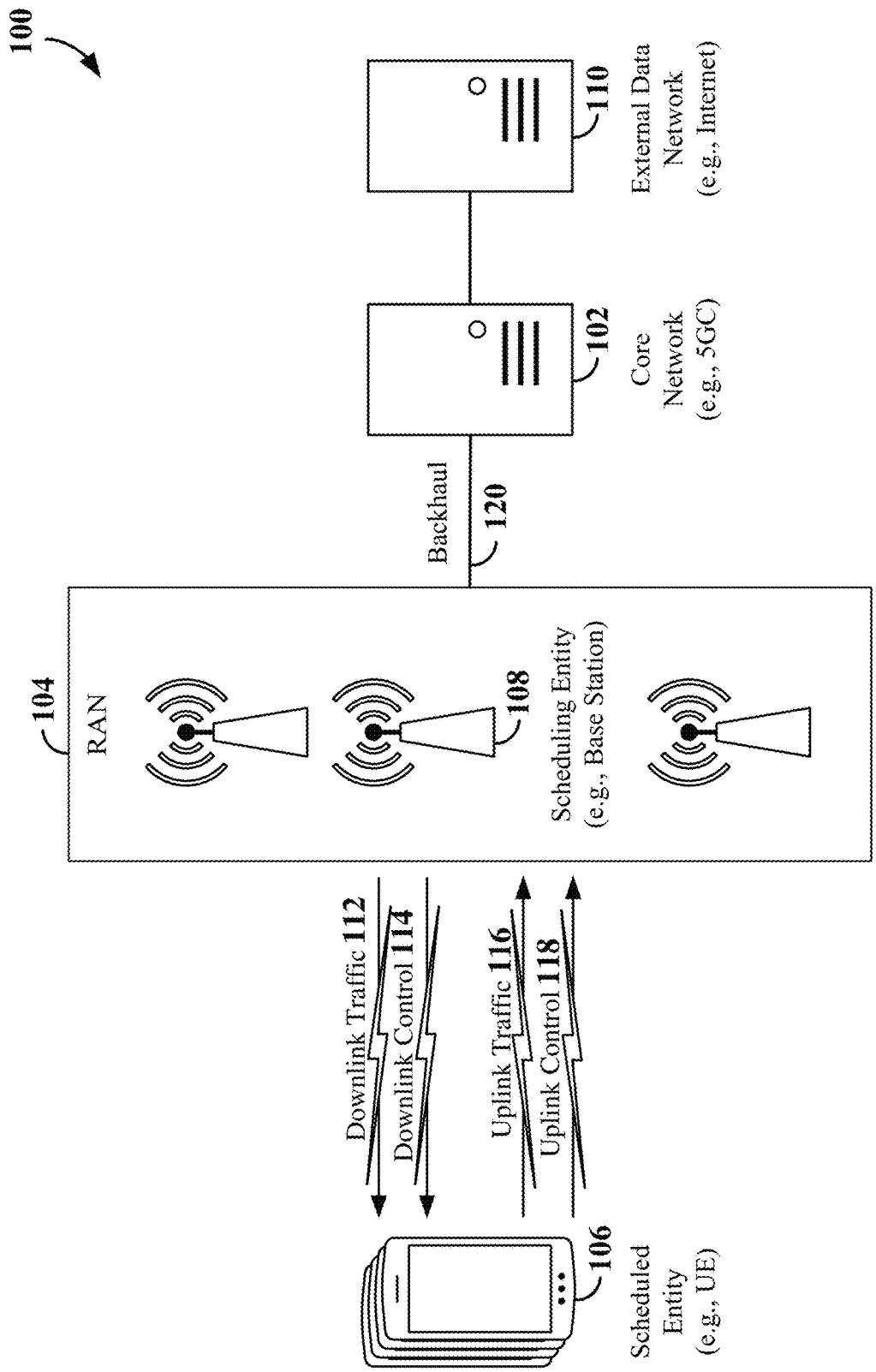
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the present disclosure relate to reconstructing a received data signal that has been subjected to a non-linear distortion (e.g., clipping). For example, a transmitting device may clip peaks of a signal to be transmitted to reduce the peak-to-average power ratio (PAPR) at the power amplifier of the transmitting device. This clipping results in non-linear distortion in the transmitted data signal (e.g., carrying control information, user data, or other information), which may adversely affect the recovery of this signal by a receiving device. To improve the decoding performance at the receiving device, the transmitting device provides non-linearity (e.g., clipping) information regarding some of the samples that have been subject to a non-linearity (e.g., information regarding some of the samples that have been clipped) to the receiving device.

According to some aspects, the receiving device uses a two-part signal reconstruction process where, during a first part of the signal reconstruction process, the receiving device partially reconstructs the received data signal based on the non-linearity information. During a second part of the signal reconstruction process, the receiving device estimates the remaining non-linear distortion in the partially reconstructed signal (e.g., due to clipped samples that were not indicated in the clipping information) by slicing the partially reconstructed signal, applying a non-linearity to (e.g., clipping) the sliced signal, and generating a final reconstruction of the data signal based on the resulting (e.g., clipped) signal and the non-linearity information. In some examples, the second part of the signal reconstruction process may reconstruct the data signal based, at least in part, on knowledge of a threshold (e.g., a clipping threshold) used by the transmitting device.

In some examples, the non-linearity information is peak suppression information for a first subset of peaks of the data signal (e.g., information regarding a first subset of peaks that have been clipped). The transmitting device transmits the non-linearly distorted (e.g., clipped) signal and peak suppression information to the receiving device. During the first part of the signal reconstruction process, the receiving device reconstructs the first subset of peaks based on the peak suppression information and inserts the reconstructed peaks into the received data signal to generate the partially reconstructed signal. During the second part of the signal reconstruction process, the receiving device performs one or more iterations of a peak reconstruction process to generate a final reconstructed signal that includes a second subset of peaks of the data signal (e.g., a subset of the clipped peaks that was not indicated in the peak suppression information).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
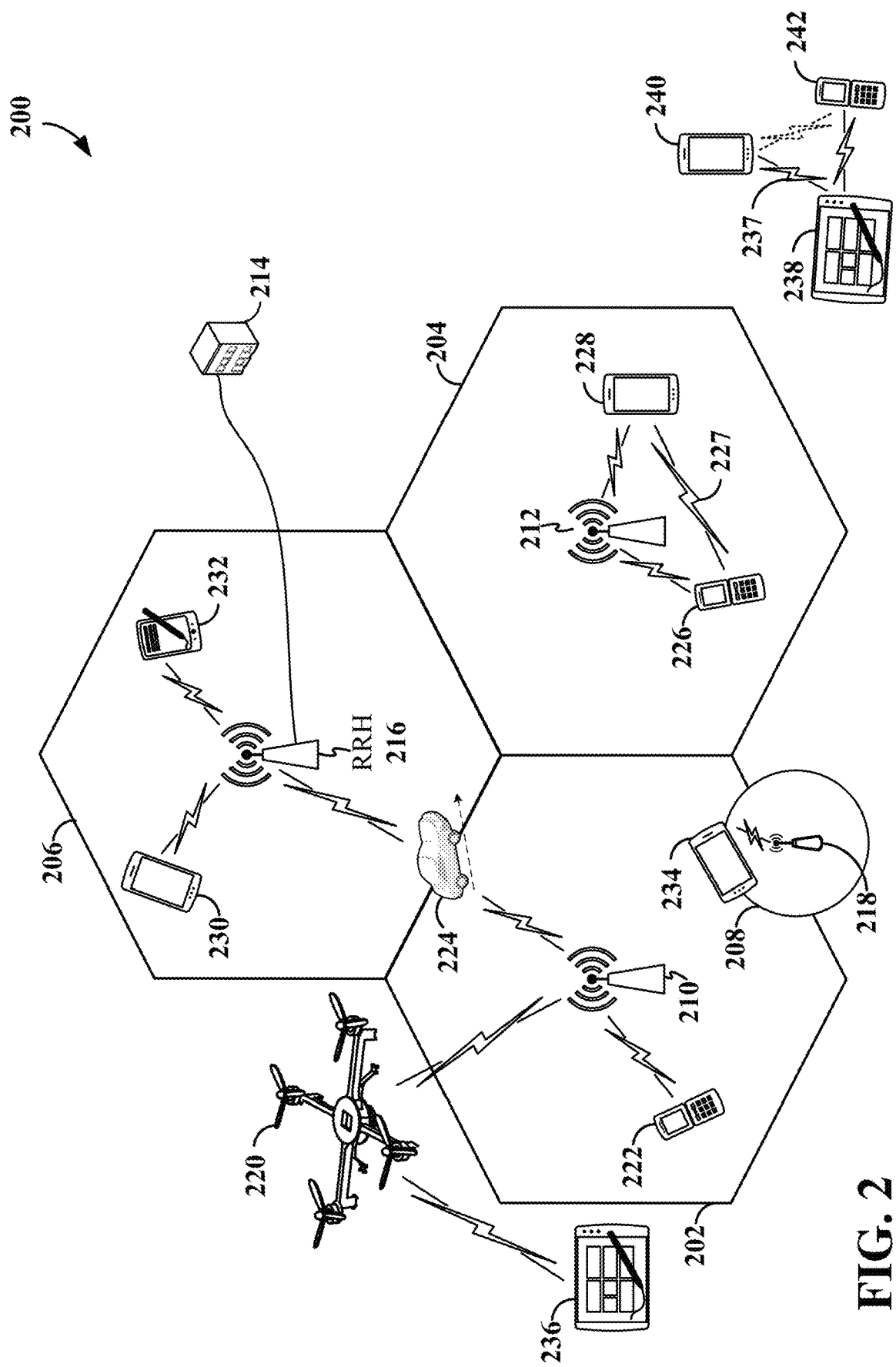
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., the quadcopter), can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-1-DMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
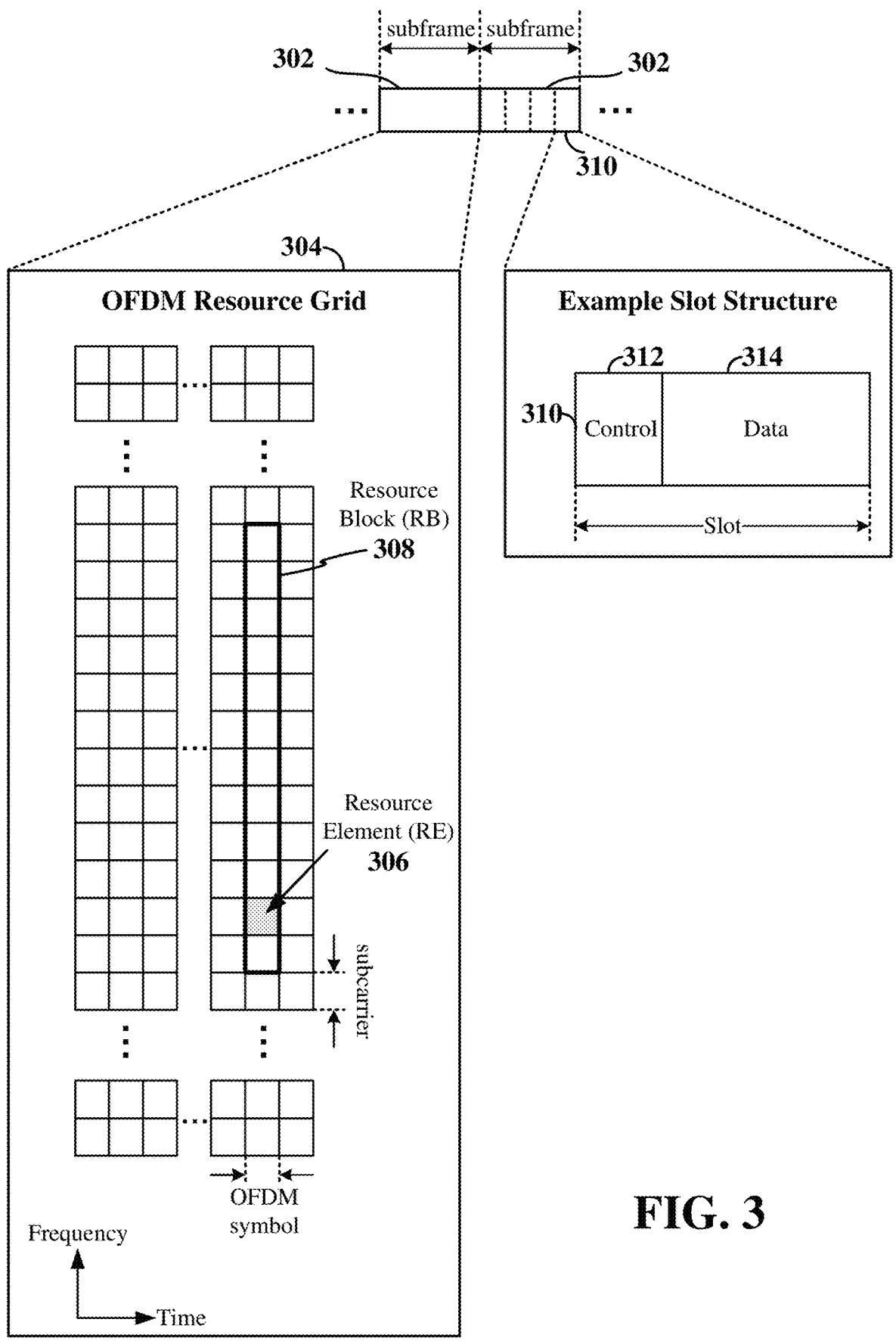
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The PBCH in the SSB may further include a master information block (MIB) that includes various system information, along with parameters for decoding a system information block (SIB). The SIB may be, for example, a SystemInformationType 1 (SIB 1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
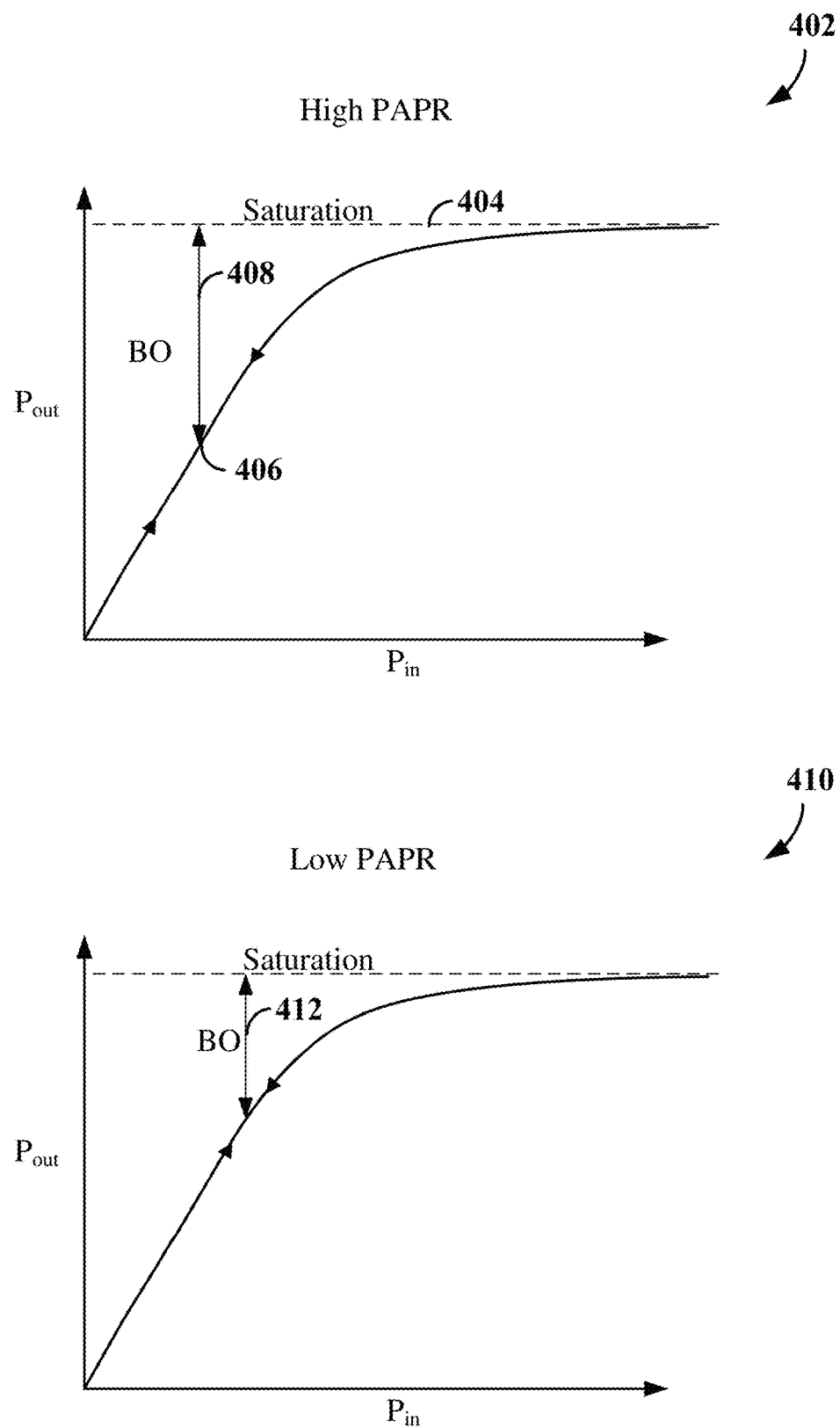
FIG. 4 is a conceptual illustration of an example of non-linearity of a power amplifier and different backoffs according to some aspects.

Power amplifiers such as those used in wireless communication devices (e.g., UEs and base stations) typically exhibit non-linear behavior at higher levels of input power. The graph 402 of FIG. 4 illustrates an example of a power out (Pout) to power in (Pin) characteristic of a power amplifier. Here, it may be seen that the amplification by the power amplifier is linear at a lower levels of Pin. As Pin increases, however, the amplification becomes non-linear and the power amplifier ultimately reaches a saturation level 404 corresponding to a maximum output power.

This amplifier-induced non-linearity may result in in-band and out-of-band distortion of the amplified signal, and a degraded (i.e., larger) error vector magnitude (EVM) at a receiver of the signal. EVM is a measure of the distance between the points on a constellation corresponding to a received signal and their ideal constellation locations. Since each constellation point represents a different phase and amplitude combination, to ensure low EVM at a transmitter, the power amplifier of the transmitter should have a sufficiently large operating range to represent the range of amplitudes in a signal to be transmitted.

To avoid this non-linearity, the power amplifier may be operated at a working point 406 that is several decibels (dBs) lower than the saturation level as represented, for example, by the backoff (BO) 408. An appropriate power level may be determined by selecting an input power that maintains the signal below a certain level. For example, a BO can be chosen to be proportional to the peak-to-average power ratio (PAPR). As another example, if a signal has a PAPR of x dB, a backoff (BO) 408 of x dB may be used to avoid the non-linearity region even at the peak of the input signal. In practice, various tradeoffs may be made in selecting a desired operating point for a power amplifier.

The use of orthogonal frequency division multiplexing (OFDM) as discussed above may enable more efficient channel estimation at the receiver and provide greater flexibly in utilizing the available time and frequency resources. However, the use of OFDM may result in a higher PAPR compared to single carrier techniques.

In addition, some applications may use a relatively high order modulation scheme such as 256 quadrature amplitude modulation (QAM), 1024 QAM, or even 16K QAM for signal transmission. However, the use of a higher order modulation scheme may result in higher power consumption compared to the power consumption incurred when using a lower order modulation.

To maximize a power amplifier's power efficiency: $\mu=P_{out}/P_{in}$, the working point for the power amplifier may be made as close as possible to the non-linear part of the Pout to Pin curve. In scenarios where the PAPR is relatively high (e.g., OFDM scenarios), a relatively large BO (e.g., as in the graph 402) may be used to ensure that the EVM required for higher order modulation schemes is met. However, a large BO results in an inefficient use of the power amplifier since the highest output power achieved may be lower than the power level the power amplifier is capable of providing in its linear range. Reducing the PAPR will enable the use of a smaller BO and enable a working point with higher power efficiency, without compromising EVM.

The graph 410 of FIG. 4 illustrates an example where a smaller BO 412 is used (e.g., in a low PAPR scenario). This results in a more efficient use of the power amplifier since the highest output power achieved is closer to the power output the power amplifier is capable of providing, while still operating in the power amplifier's linear operating range.

To address these competing issues, the peaks of a signal to be transmitted may be clipped, thereby reducing the PAPR, while still using an operating point with a desired level of power efficiency. However, clipping introduces non-linearity into the signal which may make it more difficult for a receiving device to successfully decode the clipped signal.

The disclosure relates in some aspects to encoding and decoding techniques that enable a transmitting device (e.g., a UE or a base station) to transmit a data signal at a relatively low PAPR through the use of a non-linear function such as clipping, while enabling a receiving device (e.g., a UE or a base station) to effectively decode the received data signal. For purposes of explanation, the discussion that follows may describe examples where a non-linear function applied to a signal involves a clipping operation. It should be understood that any discussion of clipping herein could be substituted with some other type of non-linearity.

A transmitting device may clip peaks in a data signal (e.g., carrying control information, user data, or other information) that have relative high amplitudes. In some examples, samples of a data signal having amplitudes that exceed a threshold value may be referred to as the peaks of the data signal. The transmitting device may generate clipping information indicating a subset of the peaks that have been clipped and send this information to the receiving device (e.g., along with the clipped signal). In this example, the transmitting device sends clipping information for only a subset of the clipped peaks to reduce the overhead associated with generating the clipping information and sending the clipping information to the receiving device. In some examples, the subset of clipped peaks constitutes on the order of 1% of the total number of clipped peaks. The message used for sending this clipping (peak suppression) information may be referred to herein as a reduced peak suppression information message (RPSIM).

In some examples, the receiving device uses a hybrid reconstruction method composed of two stages. In a first stage (Stage I), upon receipt of the clipped signal and the clipping information, the receiving device may identify the subset of clipped peaks of the clipped signal, reconstruct these peaks, and recombine the reconstructed peaks with the clipped signal to provide a partially reconstructed signal. In a second stage (Stage II), the receiving device may perform one or more iterations of a peak reconstruction process to modify the partially reconstructed signal to include the remaining clips that were clipped, but not indicated by the clipping information. In some examples, the iterative peak reconstruction process may reconstruct the peaks based, at least in part, on knowledge of the clipping threshold used by the transmitting device.

In an implementation that uses RPSIM, in the first stage (Stage I), the receiving device reconstructs a first subset of the peaks based on the RPSIM. In the second stage (Stage II), the receiving device reconstructs a second subset of the peaks autonomously (e.g., without using peak suppression information for the second subset of peaks). In some examples, the second stage involves a Bussgang decomposition-based peak reconstruction procedure. In some examples, this procedure may involve estimating the remaining non-linear distortion in the partially reconstructed signal by slicing a first scaled version of the partially reconstructed signal (e.g., scaled by a Bussgang coefficient $\alpha$) and then applying the same non-linearity (e.g., clipping) used at transmitting device to the sliced signal. In some examples, the first scaled version of the estimate is: $y_{corrected}/\alpha$, where $y_{corrected}$ is a version of the partially reconstructed signal that has been corrected by subtracting an estimate of the non-linear distortion that occurred but was not signaled in the RPSIM. An estimate of the remaining non-linear distortion may then be obtained from this result by adding the RPSIM peaks signal and removing a second scaled version of the sliced signal. In some examples, the second scaled version of the estimate is: $\alpha \hat{x}$, where $\hat{x}$ is the result of the slicing of $y_{corrected}/\alpha$.

The techniques described herein may be implemented, for example, to suppress the amplitudes of detected peaks in a data signal, which may substantially reduce PAPR associated with the transmission of the data signal. This reduction in PAPR enables the transmitting device to use a lower BO which, in turn, may lead to higher power efficiency of power amplifiers used to communicate the data signal. Moreover, this may be achieved while maintaining an acceptable error vector magnitude (EVM), thereby enabling a receiving device to more effectively decode a received clipped data signal. EVM is a measure of the distance between the points on a constellation diagram (used for signal modulation) and their ideal locations. Since each constellation point represents a different phase and amplitude combination, reducing the amplitudes of some of the samples of the data signal may degrade EVM at the transmitting device. However, transmitting the RPSIM with the amplitude-suppressed data signal may enable a device receiving this transmission to use the included peak suppression information to reconstruct the peaks in the data signal. As a result, the receiving device may demodulate and decode the data symbols of the received data signal without loss of precision or accuracy. Accordingly, some of the techniques described herein may provide for relatively improved power efficiency at the transmitting device while maintaining a relatively low EVM at the receiving device.

Figure 5:
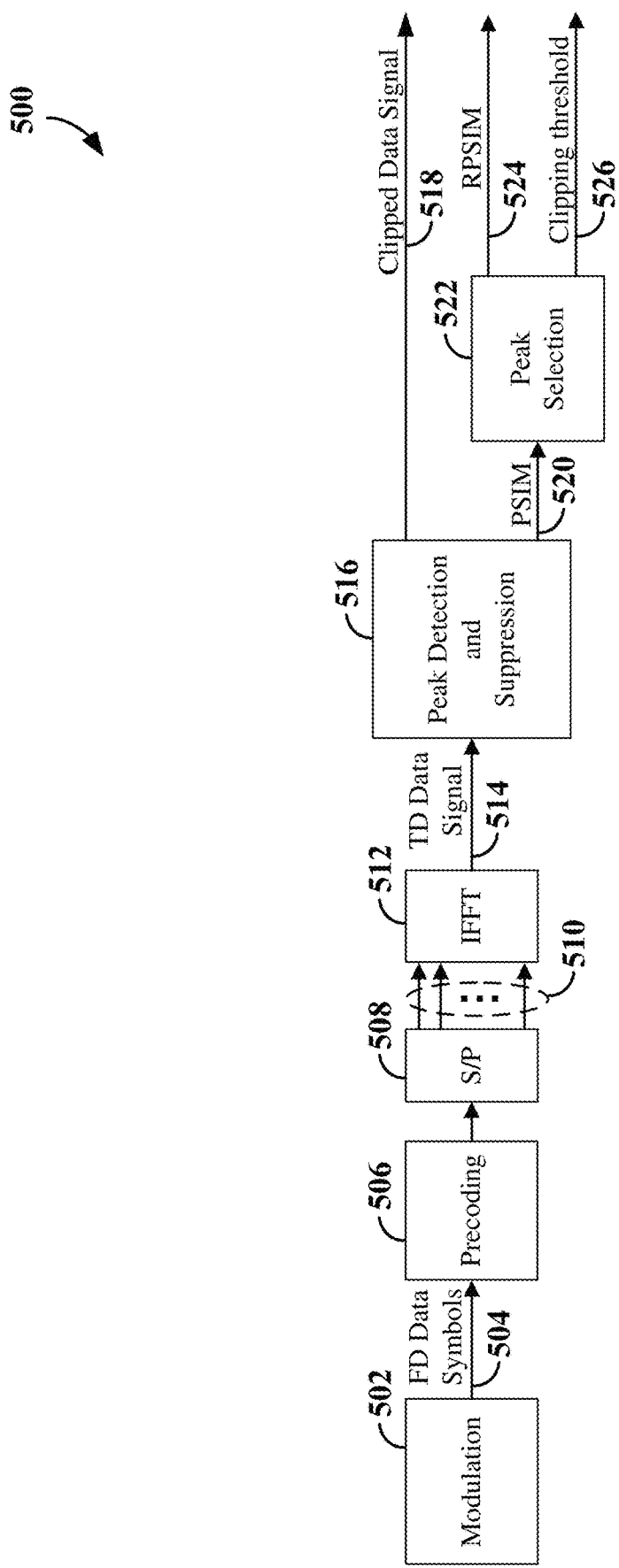
FIG. 5 is a schematic illustration of an example of a transmit chain according to some aspects.

FIG. 5 illustrates an example transmit chain 500 of a transceiver that clips a data signal to be transmitted (e.g., by suppressing all of the amplitudes of a signal that exceed a threshold amplitude level) and transmits the data signal to a receiving device with information indicative of the clipping. To reduce the complexity of FIG. 5, some of the components (e.g. amplifiers, filters, etc.) of the transmit chain 500 are not shown. Initially, a modulation circuit 502 generates modulated frequency domain (FD) data symbols 504 representing data to be sent to a receiving device. For example, for QAM-based modulation, each FD data symbol 504 may constitute in-phase (I) and quadrature (Q) components of the original data signal. A precoding circuit 506 may apply a precoding matrix to the frequency domain data symbols 504 (e.g., to reduce the channel). A serial-to-parallel circuit 508 converts the serial stream for the symbols 504 into several parallel streams 510. An inverse fast Fourier transform (IFFT) circuit 512 converts the frequency domain symbols from the parallel streams 510 to a time domain (TD) data signal 514. For example, for QAM-based modulation, each TD data symbol may constitute in-phase (I) and quadrature (Q) samples, i.e., time domain IQ samples. For convenience, time domain IQ samples may be referred to as samples herein.

Figure 6A:
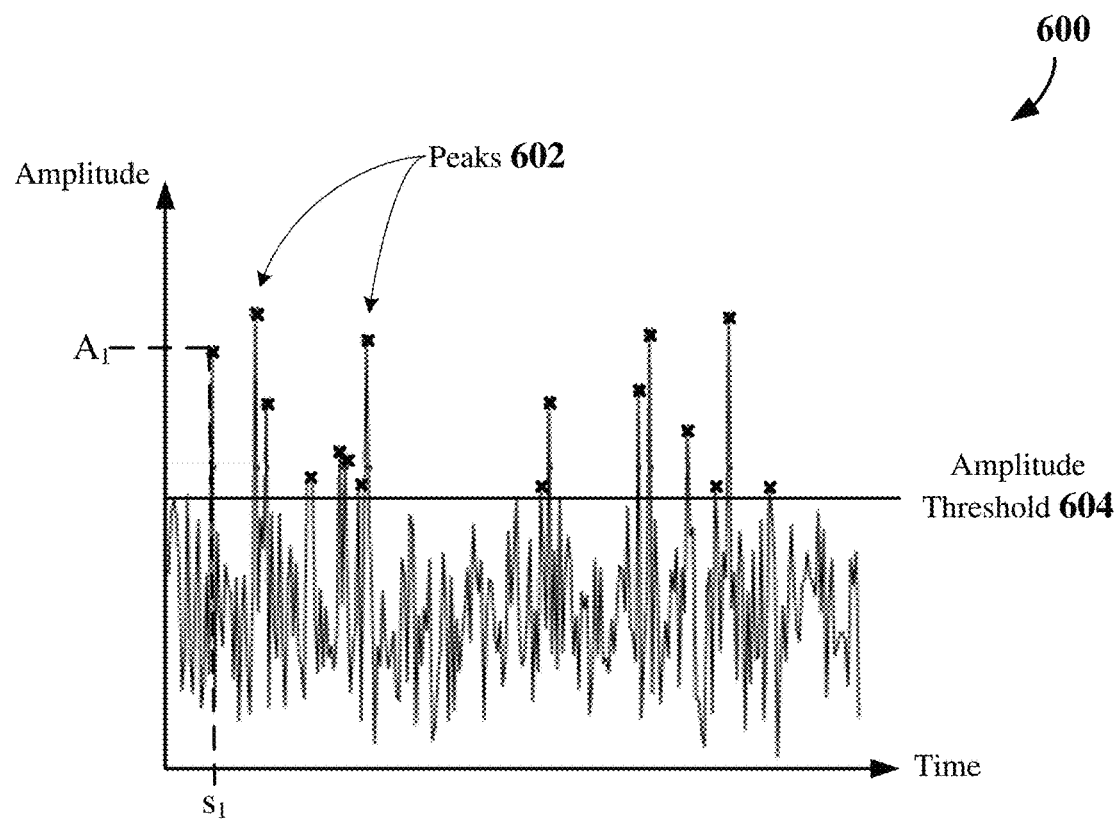
FIG. 6A is a conceptual illustration of an example of peaks in a signal according to some aspects.

A peak detection and suppression circuit 516 detects one or more peaks of the time domain data signal 514. As used herein, the term "peak" may refer to any sample of a data signal (e.g., as produced by an IFFT) having an amplitude that exceeds a threshold amplitude level. FIG. 6A illustrates an example of a time domain data signal 600. As shown, the time domain data signal 600 includes several peaks (e.g., peaks 602) that exceed an amplitude threshold 604.

Figure 6B:
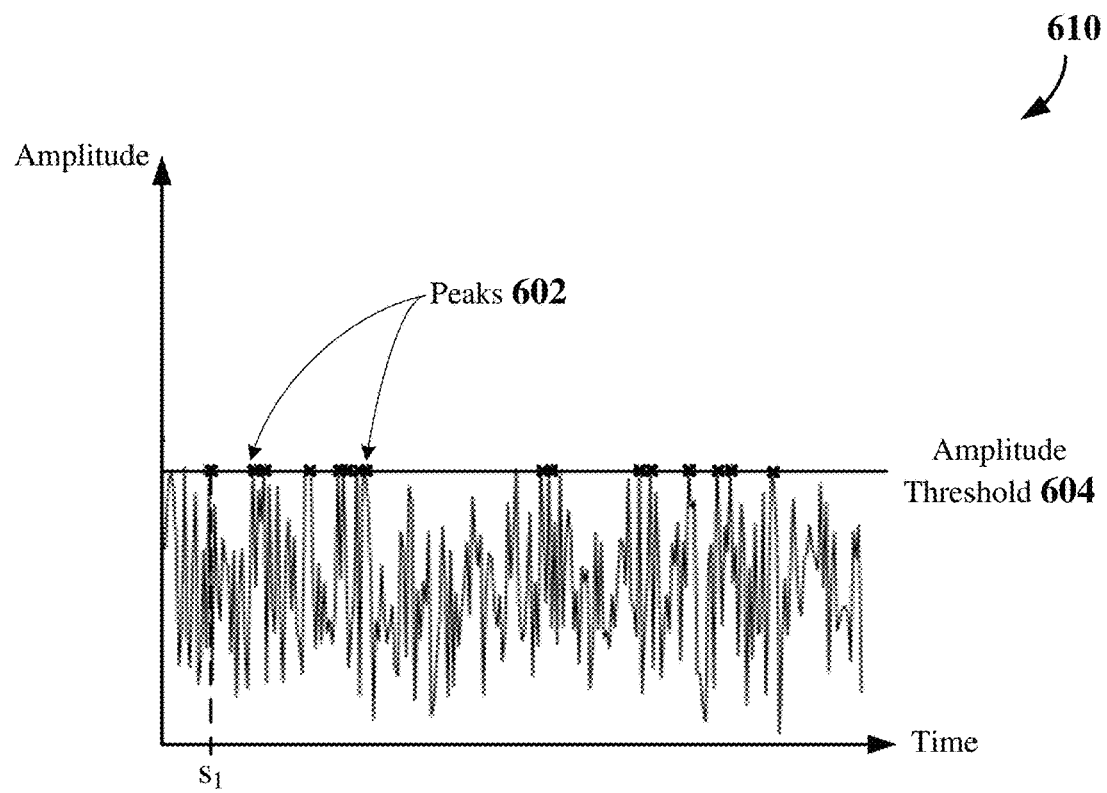
FIG. 6B is a conceptual illustration of an example of clipped peaks in a signal according to some aspects.

The peak detection and suppression circuit 516 may clip the time domain data signal 514 by, for example, reducing the amplitudes of the samples associated with the detected peaks. In some examples, the peak detection and suppression circuit 516 clips all samples that exceed a threshold. FIG. 6B illustrates an example of a time domain data signal 610 after such a clipping operation. Here, it may be seen that the magnitudes of the peaks (e.g., peaks 602) that exceeded the amplitude threshold 604 have been reduced so that the maximum values of these peaks are at the amplitude threshold 604. The peak detection and suppression circuit 516 then outputs the resulting clipped data signal 518 (e.g., the time domain data signal 610 of FIG. 6B) for transmission to the receiving device.

The peak detection and suppression circuit 516 may generate clipping information (e.g., which may be referred to herein as peak suppression information) indicating the amplitudes and positions of samples of the data signal associated with the detected peaks. For example, for each of the peaks that exceed the amplitude threshold 604 of FIG. 6A, an amplitude value (e.g., amplitude $A_1$) and a position value (e.g., position $s_1$) may be determined. To reduce the overhead associated with transmission of the peak suppression information, the peak detection and suppression circuit 516 may compress the peak suppression information. For example, the peak detection and suppression circuit 516 may quantize the amplitude values (e.g., by representing the amplitude values by one bit or two bits). As a further example, the peak detection and suppression circuit 516 may generate the peak suppression information to include only the differential positions between consecutive peaks (e.g., without indicating the order of the peaks). In this case, the peak detection and suppression circuit 516 may determine a probability distribution of consecutive peaks based on the differential peak locations, and employ a compression algorithm (e.g., a Huffman compression algorithm) that provides a compressed description of the indices of the time samples for the peaks. As indicated in FIG. 5, the peak detection and suppression circuit 516 may output the peak suppression information for all of the peaks in, for example, a peak suppression information message (PSIM) 520.

In some cases, a given data signal may include a relatively larger number of peaks than other data signals. A PSIM that identifies, for example, an amplitude and position of samples for each peak exceeding an amplitude threshold for this data signal will thus use a correspondingly greater amount of overhead to signal this information for each of the larger number of peaks. Because the PSIM may occupy a dedicated control channel as well as the PDCCH and/or PDSCH for communicating data signals, the increased overhead for the PSIM may result in decreased throughput when communicating the data signals.

As mentioned above, the disclosure relates in some aspects to the use of a reduced PSIM (RPSIM), for example, in place of a PSIM. A PSIM may include amplitude and position information for each of the peaks in a corresponding data signal (e.g., for each peak having an amplitude that exceeds an amplitude threshold). In contrast, an RPSIM may include such amplitude and position information for a subset of these peaks. For example, an RPSIM may identify samples for some portion (e.g., on the order of 1%), or, alternatively, a fixed number, of the peaks having amplitudes that exceed an amplitude threshold (e.g., amplitudes of respective peaks being greater than the amplitude threshold) as compared to a PSIM used for the same corresponding data signal. In this way, an RPSIM may use relatively less overhead than the use of a PSIM for the same corresponding data signal. Accordingly, the use of the RPSIM may result in increased throughput for the data signal as compared to the use of the PSIM.

While the RPSIM may identify samples for a subset of a set of peaks in a data signal, each of the set of peaks in the data signal may still be reduced, as described herein. Thus, the RPSIM may provide information to a device (e.g., a UE) receiving the RPSIM to recreate a subset of the set of peaks of the original data signal (e.g., rather than all of the peaks of the original data signal).

To reduce the overhead associated with transmission of the peak suppression information as discussed above, the transmit chain 500 includes a peak selection circuit 522 that selects only a subset of the peak suppression information for transmission to the receiving device. For example, the peak selection circuit 522 may elect to include only peak suppression information for the largest subset of peaks (or some other subset of peak) in an RPSIM 524 to be transmitted to the receiving device (e.g., via a dedicated control channel or a shared control channel).

In some examples, the peak selection circuit 520 may also output a clipping threshold 526 to be transmitted to the receiving device. For example, the clipping threshold 526 may be the threshold (e.g., the amplitude threshold 604 of FIG. 6B) that was used to clip the original data signal.

Figure 7A:
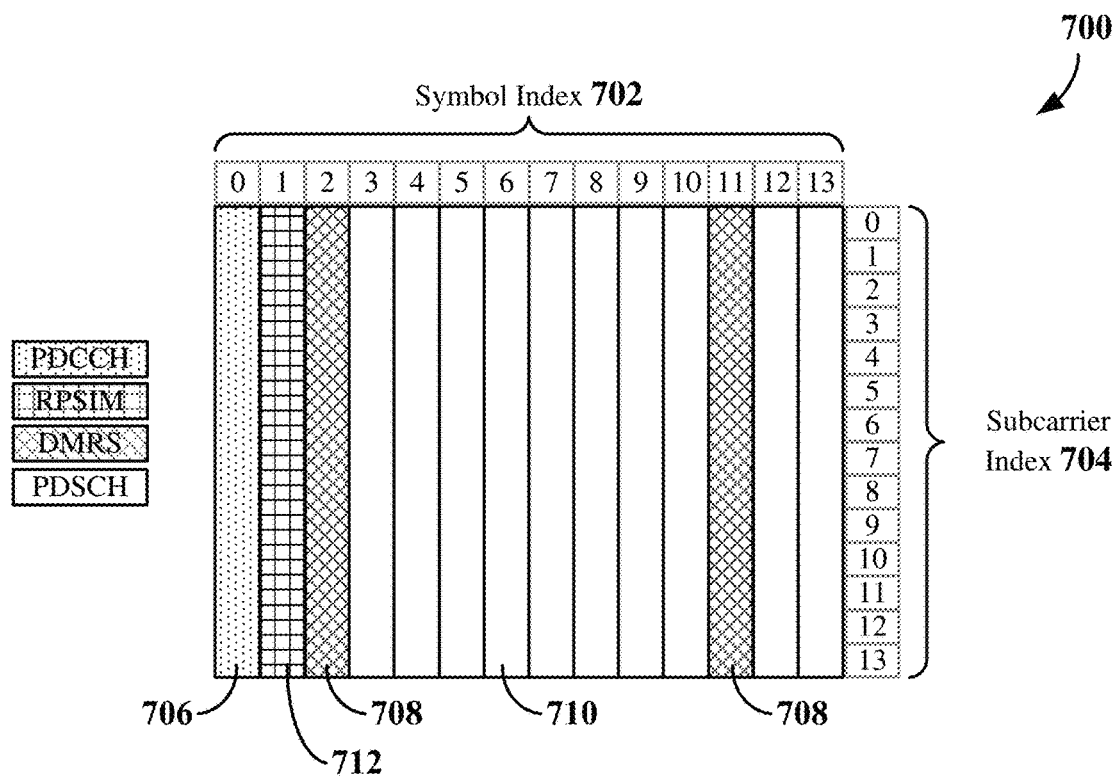
FIG. 7A is a conceptual illustration of an example of resources for carrying clipping information according to some aspects.
Figure 7B:
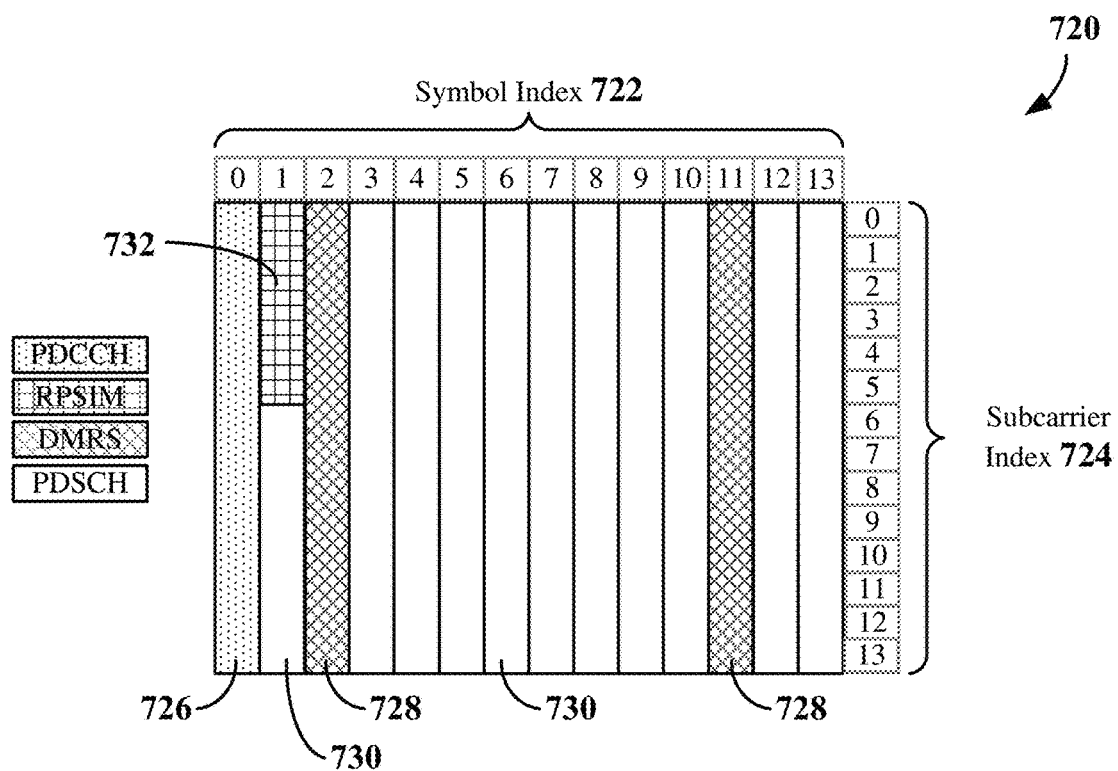
FIG. 7B is a conceptual illustration of another example of resources for carrying clipping information according to some aspects.

As shown in FIGS. 7A and 7B, an RPSIM may be mapped for transmission to a set of resources (e.g., a set of time-frequency resources). FIG. 7A illustrates an example of a slot 700 with 14 symbols indicated by a symbol index 702 and 14 subcarriers indicated by a subcarrier index 704. The slot 700 carries a PDCCH (e.g., a PDCCH 706 in symbol 0), a DMRS (e.g., a DMRS 708 in symbols 2 and 11), and a PDSCH (e.g., a PDSCH 710 in symbols 3-10, 12, and 13). In some examples, the RPSIM resources may be configured as a dedicated control channel (e.g., an RPSIM 712 carried in a dedicated symbol 1) in the slot 700 as shown in FIG. 7A. In some examples, the RPSIM resources may be configured as a portion of another channel (e.g., a PDCCH, PUCCH, PDSCH and/or a PUSCH). FIG. 7B illustrates an example of a slot 720 with 14 symbols indicated by a symbol index 722 and 14 subcarriers indicated by a subcarrier index 724. The slot 720 carries a PDCCH (e.g., a PDCCH 726 in symbol 0), a DMRS (e.g., a DMRS 728 in symbols 2 and 11), and a PDSCH (e.g., a PDSCH 730 in symbols 1, 3-10, 12, and 13). In this example, an RPSIM 732 shares symbol 1 with the PDSCH 730. In some examples, the RPSIM (e.g., the RPSIM control channel) may be transmitted in a more robust manner than the clipped data signal. For example, a transmitting device may encode the RPSIM using more reliable coding.

Figure 8:
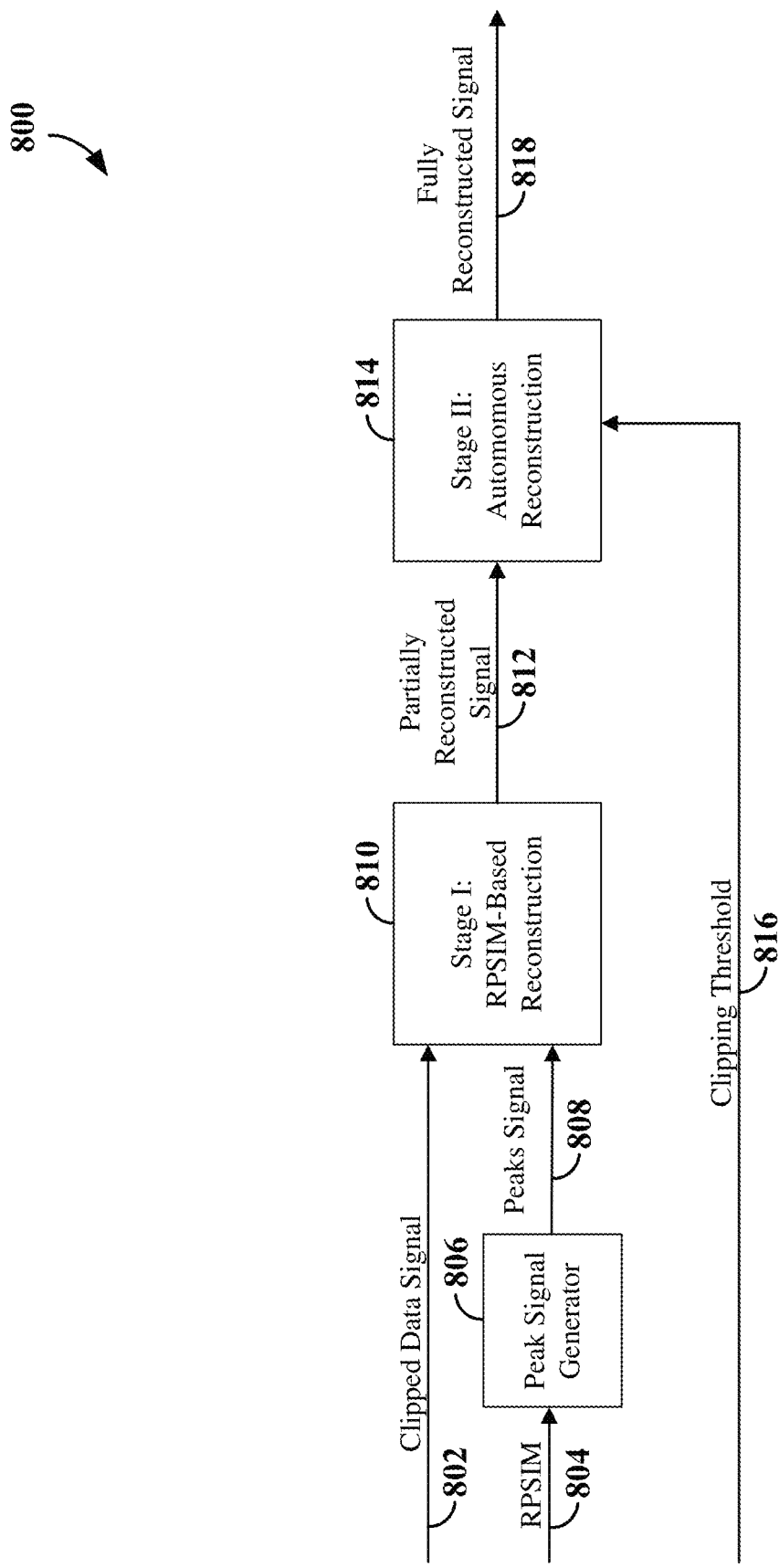
FIG. 8 is a schematic illustration of an example of a receive chain according to some aspects.

FIG. 8 illustrates an example receive chain 800 of a transceiver that uses a two-stage process for processing a clipped data signal 802 and an RPSIM 804 received from a transmitting device. Here, the clipped data signal 802 may correspond to the clipped data signal 518 of FIG. 5 and the RPSIM 804 may correspond to the RPSIM 524 of FIG. 5. The receive chain 800 reconstructs a first subset of peaks in a first stage using the RPSIM 804, and reconstructs a second subset of peaks in a second stage using an additional peak reconstruction process.

A peak signal generator circuit 806 processes the peak suppression information for the subset of indicated peaks to generate a peaks signal 808 in the form of a reconstruction of the clipped peaks from that subset. For example, the peak signal generator circuit 806 may decode the RPSIM and reconstruct the clipped samples to provide a frequency domain description of the clipped samples. Here, based on the amplitude and position information included in the peak suppression information, the peak signal generator circuit 806 may determine the amplitude and position of each peak indicated by the RPSIM 804 and generate a frequency domain signal representative of these peaks.

A component of the receive chain 800 (not shown in FIG. 8) may process the clipped data signal 802, including performing channel estimation, and performing equalization based on the channel (e.g., to determine the delay of the channel). In addition, this component may expand the channel (e.g., reverting any precoding) to obtain the full channel.

The RPSIM-based reconstruction circuit 810 combines the peaks signal 808 with the clipped data signal 802 to add the corresponding peaks back into the clipped data signal 802. For example, the RPSIM-based reconstruction circuit 810 may add these frequency domain signals together. This results in a partially reconstructed signal 812 since not all of the peaks have been added back at this point. In some examples, an estimate of the delay of the channel (e.g., as determined by a channel estimator) may be used to properly align the reconstructed peaks with the clipped data signal 802.

Figure 9:
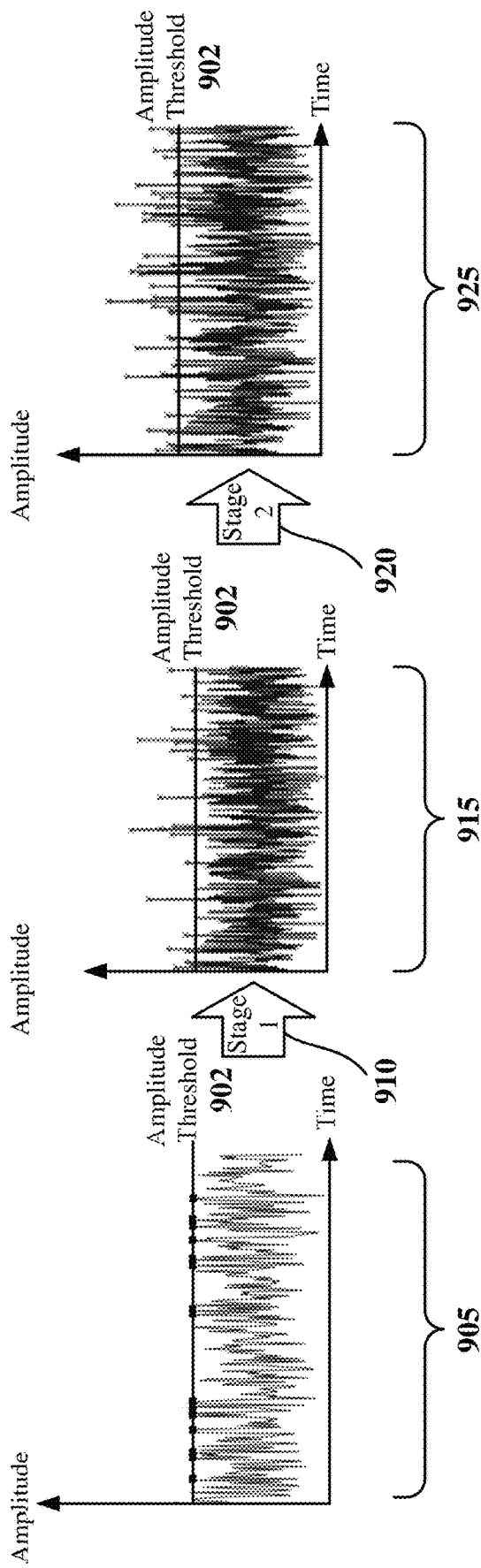
FIG. 9 is a conceptual illustration of an example of peak reconstruction for a signal according to some aspects.

FIG. 9 illustrates an example of the Stage I partial reconstruction. A first data signal 905 represents the clipped data signal 802 that was received by the receive chain 800. As indicated, the peaks of this signal do not exceed the amplitude threshold 902. The first data signal 905 may correspond to the signal 610 of FIG. 6B.

After the first stage 910 of the receive chain 800, the partially reconstructed signal 812 includes the subset of the peaks that were indicated by the RPSIM 804. A second data signal 915 represents the partially reconstructed signal 812. As indicated, some of peaks of this signal exceed the amplitude threshold 902 as in the original waveform (e.g., the signal 600 of FIG. 6A).

Referring again to FIG. 8, an autonomous reconstruction circuit 814 generates a fully reconstructed signal 818 based on the partially reconstructed signal 812 and the clipping threshold 816. This second stage of the peak reconstruction procedure may include, for example, the use of a decision-directed peak reconstruction process. In the decision-directed peak reconstruction process, the autonomous reconstruction circuit 814 may implement a digital demodulation procedure to identify and recover a second subset of peaks that were not indicated in the RPSIM. In some cases, the decision-directed peak reconstruction process may include multiple iterations of the digital demodulation procedure where the autonomous reconstruction circuit 814 iteratively reconstructs the peaks in a successive manner until reaching a pre-defined iteration limit, or satisfying a criterion indicating to autonomous reconstruction circuit 814 not to perform further iterations. In some examples, the iterative process is ceased when the error associated with the slicing is below a threshold error level.

Once the fully reconstructed signal 818 is generated, the receive chain 800 completes the demodulation of the data and decodes the data. In some examples, an inverse precoding circuit (not shown) of the receive chain 800 may apply an inverse precoding matrix to the reconstructed signal 818. For example, the inverse precoding circuit may revert any precoding that was applied at the transmitting device (e.g., expands the channel to obtain the full channel).

In some implementations, the decision-directed peak reconstruction process (e.g., Stage II) involves a Bussgang decomposition-based peak reconstruction procedure as set forth in Table 1.

TABLE 1

Decomposition based on: $y(x) = G(x) + SI = \alpha x + d$
$\alpha = \arg\min E[|y - ax|^2]$
Initialize: $\hat{d} = 0$
Iterations loop:

Correction:     $y_{corrected} = y - \hat{d}$

Decision:     $\hat{x} = \mathit{ifft}\left(\text{Slicer}\left(\mathit{fft}\left(\frac{y_{corrected}}{\alpha}\right)\right)\right)$ Estimation:     $\hat{d} = \text{Clipping}(\hat{x}) + SI - \alpha\hat{x}$ Output: $y_{corrected}$ Here, G (x) is the received signal at a receiving device, after channel equalization (e.g., the clipped data signal 802 of FIG. 8). SI is the RPSIM peaks signal after equalization (e.g., the signal 808 of FIG. 8). The term y(x)=G (x)+SI is therefore the partially reconstructed signal (e.g., the signal 812 of FIG. 8). The signal y(x) (i.e., y) is based on the original data signal x (e.g., the signal modulated by the modulation circuit 502 of FIG. 5). As discussed above, the original data signal x is subject to non-linear distortion (e.g., the clipping performed by the peak detection and suppression circuit 516 of FIG. 5).

The distorted signal may be considered a scaled version of x (e.g., ax) with a non-linear distortion component d. In some examples, the scaling factor $\alpha$ might be Bussgang coefficient. In Table 1, the Bussgang coefficient $\alpha=\arg\min E[|y-ax|^2]$. In a Bussgang decomposition $y=\alpha x+d$, the linear term x and the non-linear distortion component d a are orthogonal to each other. The manner in which a is calculated, namely $\alpha=\arg\min E[|y-ax|^2]$, guarantees this orthogonality. This can be shown by taking the derivative of the expression and comparing it to zero (0).

The parameter $\hat{d}$ a in Table 1 may represent the clipping that occurred but was not signaled in the peak side information (SI). In some examples, this SI is based on the RPSIM described herein. The peak reconstruction procedure involves estimating the non-linear distortion $\hat{d}$ a in the received signal. With each iteration of the loop, a more accurate estimate of x and $\hat{d}$ a can be obtained.

Initially, $\hat{d}$ a is set to 0. The iterative process then starts with the Correction phase where $\hat{d}$ a is subtracted from the partially reconstructed signal y. At the Decision (e.g., Slicing) phase, the resulting $y_{corrected}$ is converted to the frequency domain (e.g., to obtain the constellation representation of the OFDM symbol) using knowledge of the modulation (e.g., 64 QAM, 256 QAM, etc.) used by the transmitting device and then sliced (e.g., to estimate a value of the signal). This result is converted back to the time domain to get the estimated signal $\hat{x}$. The slicing operation of the Decision phase may take different forms in different examples. In some examples, the slicing operation is a hard slicing operation. In some examples, the slicing operation is a soft slicing operation. In some examples, the slicing operation is a transparent slicing operation. In some aspects, transparent slicing means that the output of the slicing function equals the input.

At the Estimation phase, the reconstruction process applies the same non-linearity (e.g., the same clipping threshold) to $\hat{x}$ as the transmitting device applied to the original data signal x. Here, by adding the SI and removing a scaled version of $\hat{x}$ from the clipped signal, a new estimation of $\hat{d}$ is obtained. In the next iteration of the loop, this value of $\hat{d}$ is removed from y at the Correction phase to get a better estimate of $y_{corrected}$.

The iteration loop may be performed one or more times (e.g., depending on the desired level of performance). In some examples, the iteration loop is performed a defined number of times (e.g., once, or twice, etc.).

In some examples, the iteration loop is performed until a defined criterion (e.g., convergence) is met. For example, the iterations may be stopped if the mean square error (MSE) as measured at the output of the slicer is less than or equal to an error threshold.

Referring again to FIG. 9, after the configured number of iterations, the receiving device may use the values obtained from this iterative digital demodulation procedure for the decision-directed peak reconstruction process to reconstruct the second subset of peaks in the second stage 920 of the hybrid peak reconstruction procedure. Accordingly, the receiving device may recreate one or more additional peaks (e.g., the second subset of peaks) based on the values determined by the iterative digital demodulation procedure. For example, the receiving device may recreate the one or more peaks such that the recreated peak or peaks each have an amplitude that satisfies (e.g., exceeds) the amplitude threshold (or attempts to satisfy the threshold were terminated, e.g., due to a limit on iterative repetitions). Accordingly, the receiving device may combine or add such recreated peaks to the corresponding samples of the once-corrected second data signal 915 and substitute these samples with the respective samples of the second data signal 915 to obtain the third data signal 925. As shown, the third data signal 925 includes the peaks of the second subset and is a good estimate of the original waveform (e.g., the signal 600 of FIG. 6A).

Using the algorithm described above, the receiving device may recreate a sequence of reconstructed data symbols, including the first subset of peaks recreated using the RPSIM, for example, and second subset of peaks recreated using the decision-directed peak reconstruction process, where each of the recreated peaks may more closely approximate the time-domain signal generated from the original data symbols as transmitted by the transmitting device.

Thus, via the use of the decision-directed peak reconstruction process in the second stage 920 of the hybrid peak reconstruction procedure, the receiving device may obtain the third data signal 925 by substantially reconstructing the second subset of peaks for respective samples of the second data signal 915. As shown in FIG. 9, the third data signal 925 includes numerous additional peaks that have amplitudes exceeding the amplitude threshold 902, corresponding to the first subset of peaks and the second subset of peaks. The receiving device may demodulate and decode the reconstructed data symbols according to the first and second sets of peaks obtained via the hybrid peak reconstruction procedure.

Accordingly, through the iterative procedure described above, a transmitting device (e.g., a base station) may adjust (e.g., clip, substitute, replace, etc.) one or more peaks of a data signal to reduce its PAPR and signal a subset of these adjusted peaks to a receiving device (e.g., a UE) in an RPSIM, and according to the two stage procedure described herein, the receiving device may reconstruct all or substantially all of the peaks that were reduced to recover and process the information from the originally transmitted data signal while maintaining the relatively improved throughput for such data signal communications.

In some cases, the hybrid peak reconstruction procedure may be configured and/or performed based on a capability of each of the transmitting device and the receiving device. For example, the transmitting device may transmit capability information to the receiving device indicating that the transmitting device has a capability to generate an RPSIM. Based on the capability of the transmitting device, the receiving device may transmit its own capability information to the transmitting device. For example, the receiving device may transmit capability information to the transmitting device indicating whether the receiving device has a capability to interpret the RPSIM and/or whether the receiving device has a capability to perform the decision-directed peak reconstruction process described herein. Based on the capability information received from the receiving device, for example, the transmitting device may configure the hybrid peak reconstruction procedure accordingly (e.g., to use procedures that the receiving device is capable of performing).

In view of the above, a transmitting device may adjust (e.g., clip) any number of peaks of a data signal to reduce its PAPR and signal a subset of these adjusted peaks to a receiving device (in an RPSIM). Moreover, according to the two stage procedure described herein, a receiving device may reconstruct all or substantially all of the peaks that were reduced to recover and process the information from the originally transmitted data signal while maintaining the relatively improved throughput for such data signal communications. In some examples, the use of a Bussgang decomposition-based peak reconstruction procedure may provide better performance (e.g., a 3 dB reduction in MSE or a 2 dB gain in maximum throughput) as compared to other decision-directed techniques.

Figure 10A:
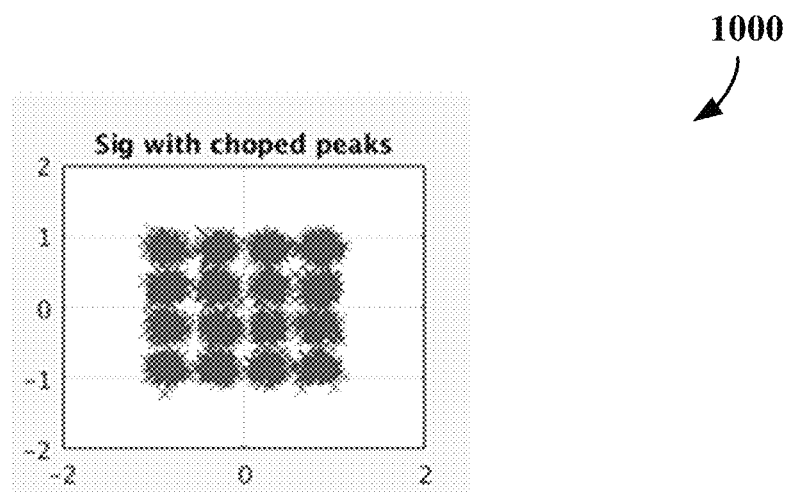
FIGS. 10A, 10B, and 10C are a conceptual illustration of an example of noise improvements in a multi-stage peak reconstruction process according to some aspects.
Figure 10B:
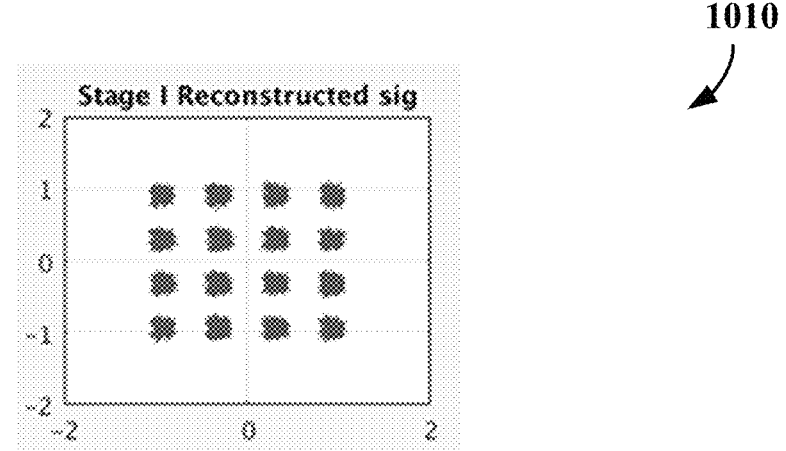
Figure 10C:
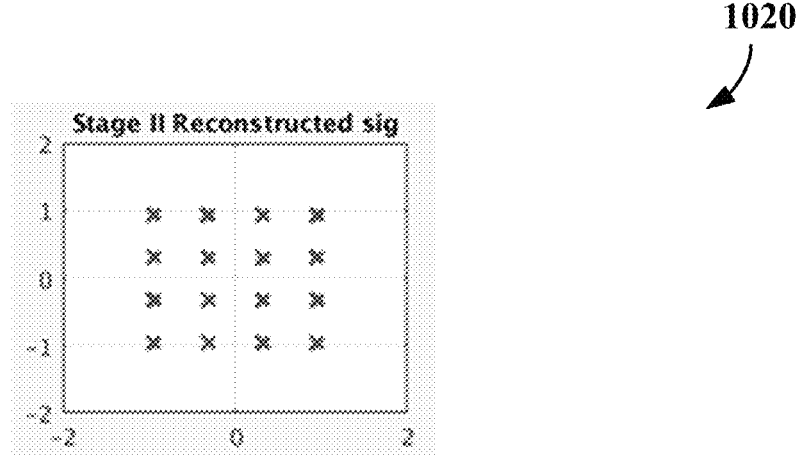

FIGS. 10A, 10B, and 10C illustrate an example of how the two-stage reconstruction process may provide a highly accurate estimation of the original data signal (e.g., x). In particular, FIGS. 10A, 10B, and 10C show 16 QAM constellations depicting example mappings of symbols that support PAPR reduction using hybrid peak reconstruction in accordance with aspects of the present disclosure. FIG. 10A shows a 16 QAM constellation 1000 depicting an example mapping of, for example, the first data signal 905, as may be received by a receiving device (e.g., a UE) from a transmitting device (e.g., a base station), as described with reference to FIG. 9.

FIG. 10B shows a 16 QAM constellation 1010 depicting an example mapping of, for example, the second data signal 915, as described with reference to FIG. 9. The receiving device may implement a first stage of a hybrid peak reconstruction procedure including the use of an RPSIM to recover a first set of adjusted peaks, as described herein. As shown in FIG. 10B, the EVM associated with each point in the constellation 1010 is substantially smaller than the EVM associated with each point in the constellation 1000 of FIG. 10A.

FIG. 10C shows a 16 QAM constellation 1020 depicting an example mapping of, for example, the third data signal 925, as described with reference to FIG. 9. As described herein, the receiving device may implement a second stage of the hybrid peak reconstruction procedure including the use of a decision-directed peak reconstruction process of a hybrid peak reconstruction procedure to recover a second set of adjusted peaks, in addition to the first stage of the hybrid peak reconstruction procedure using the RPSIM, as described with respect to the constellation 1010 of FIG. 10B. As shown in FIG. 10C, the EVM associated with each point in the constellation 1020 is substantially smaller than the EVM associated with each point in the constellation 1010 of FIG. 10B.

Figure 11:
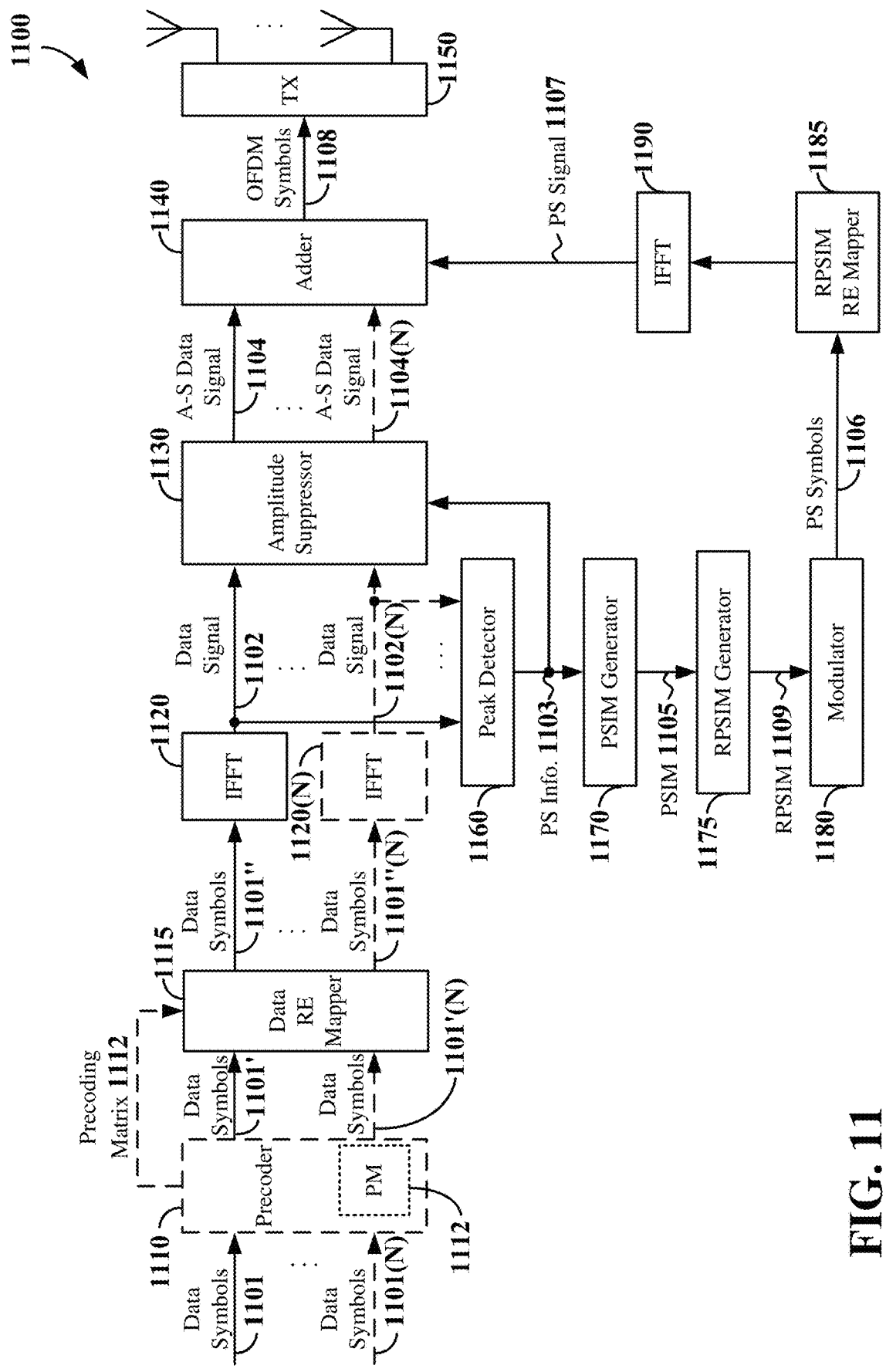
FIG. 11 is a schematic illustration of an example of a transmit chain according to some aspects.
Figure 12:
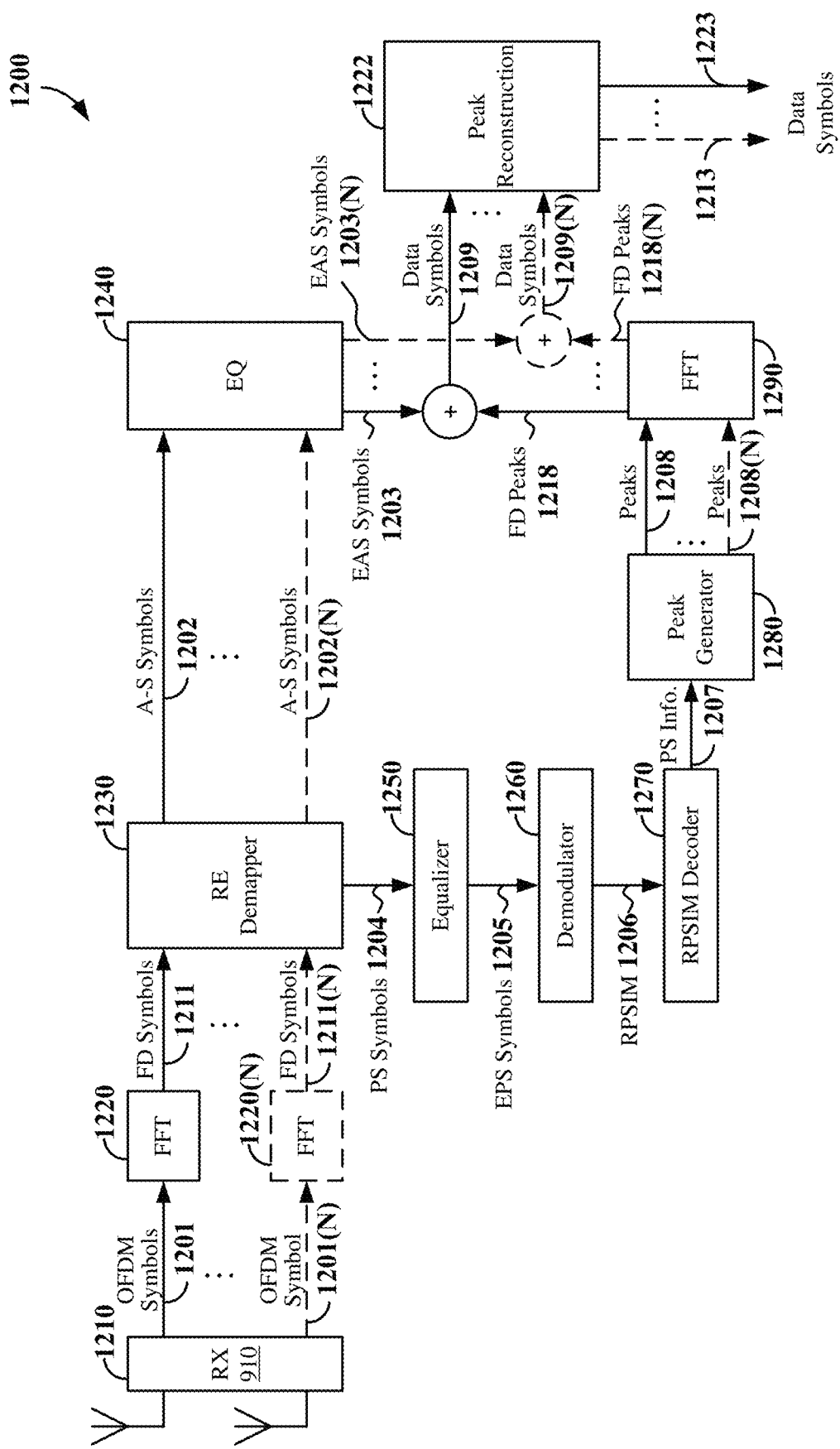
FIG. 12 is a schematic illustration of an example of a receive chain according to some aspects.

With the above in mind, FIGS. 11 and 12 illustrated a more detailed example of the transmit chain 500 and the receive chain 800, respectively, discussed above.

FIG. 11 shows an example transmit (TX) chain 1100 of a wireless communication device that supports PAPR reduction using hybrid peak reconstruction in accordance with aspects of the present disclosure. In some examples, the TX chain 1100 may correspond to the transmit chain 500 of FIG. 5. In some examples, the wireless communication device may be a base station such as any of the base stations or scheduling entities of FIG. 1 and FIG. 2. In some examples, the wireless communication device may be a UE such as any of the UEs or scheduled entities of FIG. 1 and FIG. 2. As shown in FIG. 11, solid lines depict data paths used for MIMO and non-MIMO implementations of the TX chain 1100 and dotted (or phantom) lines depict additional data paths used for MIMO implementations of the TX chain 1100.

The TX chain 1100 includes a data resource element (RE) mapper 1115, a first IFFT 1120, an amplitude suppressor 1130, an adder 1140, a transmitter 1150, a peak detector 1160, a PSIM generator 1170, a modulator 1180, an RPSIM resource element (RE) mapper 1185, and a second IFFT 1190. For non-MIMO implementations, the TX chain 1100 may obtain data symbols 1101 to be transmitted to a receiving device. The data symbols 1101 may be modulated using various digital modulation techniques. Example modulation techniques include, but are not limited to, phase-shift keying (PSK) and QAM. Thus, each of the data symbols 1101 may correspond to a point on a constellation graph (e.g., constellation plot) of the in-phase (I) and quadrature (Q) components of the modulated subcarriers. Each constellation point can be represented by a modulated amplitude and phase.

In some examples, data RE mapper 1115 maps the precoded data symbols 1101' to data symbols 1101" of one or more resource blocks. The first IFFT 1120 converts the data symbols 1101" from the frequency domain to the time domain. For example, the IFFT 1120 may produce a sequence of time-varying samples representative of the data symbols 1101". In some aspects, the data symbols 1101" may be parallelized (by a serial-to-parallel converter, not shown) at the input of the IFFT 1120, and the resulting samples may be serialized (by a parallel-to-serial converter, not shown) at the output of the IFFT 1120. The sequence of samples output by the IFFT 1120 represents a time domain data signal 1102. In some instances, the data signal 1102 may include one or more samples (or peaks) having amplitudes that are substantially higher than the average amplitude of the remaining samples.

In some examples, the peak detector 1160 may use the clipping threshold to identify peaks that have amplitudes exceeding an amplitude threshold. In some cases, the peak detector 1160 may determine the clipping threshold based on a capability of the receiving device.

The peak detector 1160 may detect one or more peaks in the data signal 1102 and generate peak suppression information 1103 describing or identifying the detected peaks. With reference to FIG. 6A, the peak suppression information 1103 may include the positions ($s_n$), amplitudes ($A_n$), and phases (not shown) of the peaks 602. The peak detector 1160 may provide the peak suppression information 1103 to the amplitude suppressor 1130.

The amplitude suppressor 1130 may adjust the data signal 1102 by reducing or suppressing the amplitudes of the samples associated with the peaks. For example, the amplitude suppressor 1130 may generate an amplitude-suppressed (A-S) data signal 1104 by replacing or substituting each of the peak amplitudes in the data signal 1102 with a suppressed amplitude. In some implementations, the suppressed amplitude may be a known or preconfigured amplitude value that is less than or equal to a corresponding amplitude threshold.

As discussed above, chopping (or reducing) the peak amplitudes of a data signal may degrade EVM at the transmitter. For example, the EVM of the A-S data signal 1104 may be worse than the EVM of the original data signal 1102. In some implementations, the TX chain 1100 may provide or otherwise indicate the peak suppression information 1103 to the receiving device to compensate for the degradation in EVM of the A-S data signal 1104. For example, the PSIM generator 1170 may generate a PSIM 1105 based on the peak suppression information 1103. In some aspects, the PSIM 1105 may include raw data representative of the peak suppression information 1103 (including the position, amplitude, and phase of each peak).

In some other aspects, the PSIM 1105 may be a compressed form of the peak suppression information 1103. For example, it is noted that the amplitude suppressor 1130 may not alter the phases of the data signal 1102 when generating the A-S data signal 1104. Accordingly, the phase information may be excluded from the PSIM 1105 to reduce the overhead of the message. The peak amplitudes also may be represented as polar amplitudes in the PSIM 1105. By using the polar notation, the amplitudes of the peaks may be reduced without changing their phases. Other suitable compression techniques may include, but are not limited to, wavelet compression, per-antenna representation of the position of each peak, analog coding, and limiting the peak position vector to a number of known options. In some implementations, the PSIM generator 1170 may compress the peak suppression information 1103 by quantizing the peak amplitudes into one or more quantization levels.

In some examples, the PSIM 1105 may include an indication of the quantization levels and a mapping of each of the peaks to one of the quantization levels. For example, for each quantization level, the PSIM 1105 may indicate the positions of the peaks 602 of FIG. 6 (or samples of the data signal) having amplitudes represented by that quantization level. For example, a first set of positions (e.g., including position $s_1$ in FIG. 6A) may be mapped to a first quantization level, a second set of positions may be mapped to a second quantization level, and a third set of positions may be mapped to a third quantization level. In some implementations, the transmitting device may transmit quantization information to the receiving device indicating the amplitude ranges associated with each of the quantization levels. In some other implementations, the quantization information may indicate an average (mean or median) amplitude of the peaks associated with each quantization level. The quantization information enables the receiving device to determine the quantized amplitudes of each of the peaks based on the mapping of the peaks to the quantization levels in the PSIM 1105.

In some examples, the PSIM generator 1170 may further reduce the size or overhead of the PSIM 1105 by representing the positions of at least some of the peaks 602 as differential values. For example, a peak's position (e.g., position $s_1$ in FIG. 6A) may be represented in a differential manner as the difference between the peak's position and the previous peak's position. Thus, the position of only one of the peaks (the "initial peak position") may need to be individually represented in the PSIM 1105 (e.g., using 12 bits), and the position of each of the remaining peaks may be represented by its distance to the previous peak position (e.g., using <12 bits).

In some examples, the PSIM generator 1170 may further reduce the size or overhead of the PSIM 1105 by representing the positions of at least some of the peaks 602 as differential values. For example, by quantizing the peak amplitudes, multiple peaks may be associated with the same quantization level. Thus, at least some of the peaks 602 may be characterized by their distances to other peaks 602 in the same quantization level. For example, a peak's position (e.g., position $s_1$ in FIG. 6A) may be represented as the difference between the peak's position and the previous peak's position. Thus, the position of only one of the peaks in each quantization level (the "initial peak position") may need to be individually represented in the PSIM 1105 (12 bits), and the position of each of the remaining peaks in the same quantization level may be represented by its distance to the previous peak position (e.g., <12 bits).

The PSIM generator 1170 may pass information to the RPSIM generator 1175, which may select a subset of the peak suppression information to be including in an RPSIM 1109 to be transmitted to the receiving device. In some cases, the RPSIM generator 1175 may determine a peak selection mode for the receiving device to determine a subset of the set of peaks using the RPSIM 1109. For example, the RPSIM generator 1175 may determine a first subset of peaks for the receiving device to reconstruct using the RPSIM 1109, and the RPSIM generator 1175 may generate an RPSIM 1109 based on the peak suppression information 1103 and the PSIM 1105, where the RPSIM 1109 may include information identifying the first subset of peaks that the receiving device is to reconstruct using the RPSIM 1109.

In some cases, different techniques may be used (e.g., according to different peak selection modes) to determine the first subset of peaks for different performance targets and/or based on the capabilities of the transmitting device and/or the receiving device. In some cases, the peak selection mode may indicate that the receiving device perform some determination (e.g., to determine a number of peaks in the first subset of peaks) on its end that the receiving device may then use in reconstructing the peaks. In some cases, the transmitting device may determine the peak selection mode and indicate the determined mode to the receiving device via, for example, in a PDCCH, in a DCI transmission, in a MAC CE, in a radio resource control (RRC) message, or any combination of these. Additionally or alternatively, the transmitting device may include the determined mode in the peak suppression information 1103.

For example, in a first mode, the transmitting device and/or the receiving device may determine the first subset of peaks based on amplitudes for each of the respective peaks of the first subset of peaks relative to amplitudes for each of the respective peaks of the set of peaks. For example, the transmitting device and/or the receiving device may determine the first set peaks to include the peaks with the greatest amplitudes of the detected peaks. Additionally or alternatively, the transmitting device and/or the receiving device may determine the first subset peaks to include the peaks with relatively smaller amplitudes of the detected peaks.

Additionally or alternatively, the transmitting device and/or the receiving device may determine the first subset of peaks based on a quantity, for example, such that the first subset of peaks includes a number of peaks equal to (or approximately equal to) a target quantity for a number of peaks to be reconstructed by the receiving device using the peak suppression information. Additionally or alternatively, the transmitting device and/or the receiving device may determine the first subset of peaks according to a target proportion of peaks in the first subset of peaks relative to a total number of detected peaks. Additionally or alternatively, the transmitting device and/or the receiving device may determine the first subset of peaks according to a time domain density of the first subset of peaks, for example, selecting the first subset of peaks from the detected peaks to be relatively more spread out in time (e.g., selecting each $N^{th}$ peak), or, alternatively, selecting peaks that are relatively more densely located in time with respect to each other.

Additionally or alternatively, the transmitting device and/or the receiving device may determine the first subset of peaks based on a resource allocation for transmitting the peak suppression information, for example, a target size for a resource allocation for transmitting the peak suppression information. For example, in some cases the location of each peak (e.g., an amplitude, position, and/or phase of the peak) may be signaled using one or more respective bits, and the transmitting device may determine the first subset of peaks to include a number of peaks such that signaling each of the peaks' respective locations does not exceed a number of REs allocated for the peak suppression information (e.g., according to the target size for the peak suppression information and/or a maximum size for the peak suppression information).

Additionally or alternatively, the transmitting device may determine the first subset of peaks according to a random selection from the detected peaks, or, for example, in combination with any of the techniques described herein for selecting the first subset of peaks from each of the detected peaks in the set of peaks. For example, the transmitting device may use the random selection to select the first subset of peaks after narrowing down the full set of detected peaks according to amplitude or any of the other techniques described herein).

Additionally or alternatively, the transmitting device and/or the receiving device may determine the first subset of peaks based on the capabilities of the transmitting device and/or the receiving device. For example, the transmitting device and/or the receiving device may determine the first subset of peaks to include each of the detected peaks if the receiving device may have indicated a lack of support for the decision-directed peak reconstruction process, or, alternatively, to include relatively less peaks if the receiving device may have indicated support for the decision-directed peak reconstruction process.

In some examples, the peak detector 1160 may use the clipping threshold to identify peaks, for example, that have amplitudes exceeding an amplitude threshold. In some cases, the peak detector 1160 may determine the clipping threshold based on a capability of the receiving device.

In some examples, the peak detector 1160 may pass information to the adder 1140 (e.g., via the amplitude suppressor 1130) indicating the clipping threshold so that an indication of the clipping threshold may be transmitted to the receiving device (e.g., via a PDCCH, PDSCH, or other type of signaling). Additionally or alternatively, the peak detector 1160 may pass the information indicating the clipping threshold to the RPSIM generator 1175 (e.g., via the PSIM generator 1170) for the RPSIM 1109 to include the indication of the clipping threshold. Based on the indication of the clipping threshold, the receiving device may configure the amplitude threshold to use for reconstructing peaks that may exceed the threshold.

The RPSIM generator 1175 may pass information to the modulator 1180 including the RPSIM 1109, and the modulator 1180 may map the RPSIM 1109 to one or more peak suppression symbols 1106. In some examples, the modulator 1180 maps the RPSIM 1109 to one or more peak suppression symbols 1106 using digital modulation techniques. Example modulation techniques include, but are not limited to, PSK and QAM.

In some examples, an RPSIM RE mapper 1185 maps the peak suppression symbols 1106 to one or more resource blocks. The IFFT 1190 then converts the peak suppression symbols 1106 from the frequency domain to the time domain. For example, the IFFT 1190 may produce a sequence of time-varying samples representative of the peak suppression symbols 1106. In some aspects, the peak suppression symbols 1106 may be parallelized (by a serial-to-parallel converter, not shown) at the input of the IFFT 1190, and the resulting samples may be serialized (by a parallel-to-serial converter, not shown) at the output of the IFNT 1190. The sequence of samples output by the IFFT 1190 represents a time domain peak suppression signal 1107.

The adder 1140 may then combine the A-S data signals 1104, together with the peak suppression signal 1107, to provide a number of OFDM symbols 1108. The transmitter 1150 may then transmit the OFDM symbols 1108 concurrently via multiple TX antennas to the receiving device.

The OFDM symbols 1108 are provided to the transmitter 1150 for transmission, over a wireless channel, to a receiving device. The transmitter 1150 may include one or more power amplifiers to amplify the OFDM symbols 1108 transmitted via one or more TX antennas. As described above, the operating range of the power amplifier may depend on the PAPR of the OFDM symbols 1108. Because the A-S data signal 1104 has a significantly lower PAPR than the original data signal 1102, aspects of the present disclosure may improve the efficiency of the power amplifier while reducing the power consumption of the transmitting device.

MIMO implementations of the TX chain 1100 may additionally include a precoder 1110 and a number (N) of first IFFTs 1120. The precoder 1110 may apply a precoding matrix (PM) 1112 to N parallel streams of data symbols 1101-1101(N) to produce N pre-coded data symbols 1101'-1101'(N). The N pre-coded data symbols 1101'-1101'(N) are weighted based on the precoding matrix 1112 for optimal MIMO transmissions given the channel conditions of the wireless channel. In some implementations, the transmitting device may provide an indication of the precoding matrix 1112 to the receiving device for purposes of reconstructing the data symbols 1101. In some implementations, the indication may be transmitted in DCI messages on a per-slot basis. In some other implementations, the indication may be periodically transmitted in MAC control elements (CEs) after a given number (M) of slots.

In some implementations, the transmitting device may transmit a CSI-RS to the receiving device. The receiving device may estimate the channel conditions of the wireless channel based on the CSI-RS and report a precoding matrix indicator (PMI) back to the transmitting device indicating a recommended precoding matrix to be used given the channel conditions of the wireless channel. In some aspects, the transmitting device may use the precoding matrix recommended by the receiving device. Accordingly, the transmitting device may indicate, in the PDCCH, that the precoding matrix 1112 is the same as (or matches) the recommended precoding matrix indicated by the PMI.

For MIMO implementations, the TX chain 1100 may perform substantially the same operations as the non-MIMO implementations of the TX chain 1100 on multiple concurrent or parallel streams of N data symbols 1101-1101(N). For example, the N IFFTs 1120 may simultaneously convert N streams of data symbols 1101"-1101" (N) to N data signals 1102-1102(N), respectively. The peak detector 1160 may generate peak suppression information 1103 for each of the N data signals 1102-1102(N). The amplitude suppressor 1130 may use the peak suppression information 1103 to produce N A-S data signals 1104-1104(N) by suppressing peak amplitudes in the N data signals 1102-1102(N), respectively. The PSIM generator 1170 may generate a PSIM 1105 based on the peak suppression information 1103, the modulator 1180 may map the PSIM 1105 to one or more peak suppression symbols 1106, and the IFFT 1190 may convert the peak suppression symbols 1106 to a peak suppression signal 1107. The adder 1140 may add the N A-S data signals 1104-1104(N), together with the peak suppression signal 1107, to a number of OFDM symbols 1108, and the transmitter 1150 may transmit the OFDM symbols 1108 concurrently via multiple TX antennas.

In some implementations, the transmitting device may verify that the receiving device is capable of decoding or otherwise interpreting the peak suppression signal 1107 (or PSIM 1105) prior to implementing the peak suppression techniques described herein. For example, the transmitting device may receive capability information, from the receiving device, indicating that the receiving device is able to receive or decode peak suppression signal 1107 (or A-S data signal 1104). In some aspects, the capability information may be provided as a capability bit in an RRC message sent from the receiving device to the transmitting device. In some other implementations, the transmitting device may transmit its own capability information, to the receiving device, indicating that the transmitting device is able to transmit or generate the peak suppression signal 1107 (or A-S data signal 1104). For example, such capability information also may be provided as a capability bit in an RRC message sent by the transmitting device to the receiving device.

FIG. 12 shows an example receive (RX) chain 1200 of a wireless communications device that supports PAPR reduction using hybrid peak reconstruction in accordance with aspects of the present disclosure. In some examples, the RX chain 1200 may correspond to the receive chain 800 of FIG. 8. In some examples, the wireless communication device may be a base station such as any of the base stations or scheduling entities of FIG. 1 and FIG. 2. In some examples, the wireless communication device may be a UE such as any of the UEs or scheduled entities of FIG. 1 and FIG. 2. As shown in FIG. 12, solid lines depict data paths used for MIMO and non-MIMO implementations of the RX chain 1200 and dotted (or phantom) lines depict additional data paths used only for MIMO implementations of the RX chain 1200.

The RX chain 1200 includes a receiver 1210, a first fast Fourier transform (FFT) 1220, a resource element (RE) demapper 1230, a first equalizer (or, "EQ") 1240, a second equalizer 1250, a demodulator 1260, an RPSIM decoder 1270, a peak generator 1280, and a second FFT 1290. For non-MIMO implementations, the RX chain 1200 may receive OFDM symbols 1201 from a transmitting device. The OFDM symbols 1201 may be received via one or more antennas of the receiver 1210 and amplified by a low-noise amplifier (LNA), for example, within the receiver 1210. In some cases, the LNA may additionally or alternatively be implemented as a separate component connected with the receiver 1210. In some implementations, the OFDM symbols 1201 may include an amplitude-suppressed data signal (e.g., the A-S data signal 1104 described with reference to FIG. 11) and a peak suppression signal (e.g., the peak suppression signal 1107 described with reference to FIG. 11). As described with respect to FIG. 11, the amplitude-suppressed data signal may be a data signal having chopped (or clipped, truncated, etc.) peaks. In other words, the amplitudes of samples associated with the peaks are reduced (at the transmitting device) below a threshold amplitude level. The peak suppression signal includes information describing the peaks of the original data signal (such as the amplitude, position, or phase of each peak).

The FFT 1220 may convert the OFDM symbols 1201 from the time domain to the frequency domain. For example, the FFT 1220 may produce a sequence of frequency domain symbols 1211 representative of the amplitude-suppressed data signal and the peak suppression signal included in the received OFDM symbols 1201. Thus, the resulting frequency domain symbols 1211 may include A-S symbols 1202 and peak suppression symbols 1204 corresponding to the amplitude-suppressed data signal and the peak suppression signal, respectively, in the OFDM symbols 1201. In some aspects, the OFDM symbols 1201 may be parallelized (by a serial-to-parallel converter, not shown) at the input of the FFT 1220, and the resulting frequency domain symbols 1211 may be serialized (by a parallel-to-serial converter, not shown) at the output of the FFT 1220.

The RE demapper 1230 may be configured to parse (or, e.g., demap) the A-S symbols 1202 and the peak suppression symbols 1204 from the frequency domain symbols 1211. In some implementations, the RE demapper 1230 may parse the peak suppression symbols 1204 from a different OFDM symbol than the A-S symbols 1202. In some cases, the peak suppression symbols 1204 (depicted as PSIM) may be slotted between a PDCCH and a DMRS, for example, with reference to FIG. 7A, between the PDCCH (in symbol index 0) and a first DMRS (in symbol index 2) whereas the A-S symbols 1202 may be mapped to the remaining OFDM symbols, with the exception of symbol index 11 (e.g., which may carry a second DMRS). Accordingly, the RE demapper 1230 may identify the peak suppression symbols 1204 based on the positions of the PDCCH and the first DMRS. The RE demapper 1230 may further identify the A-S symbols 1202 based on the position of the second DMRS.

In some other implementations, the RE demapper 1230 may parse the peak suppression symbols 1204 from an OFDM symbol that also carries at least a portion of the A-S symbols 1202. With reference for example to FIG. 7B, the peak suppression symbols 1204 (depicted as RPSIM) and a portion of the A-S symbols 1202 (depicted as PDSCH) are mapped to the same OFDM symbol (in symbol index 1). Accordingly, the RE demapper 1230 may first identify the OFDM symbol which carries the peak suppression symbols 1204 based on the positions of the PDCCH and the first DMRS. The RE demapper 1230 may further separate the peak suppression symbols 1204 from the A-S symbols 1202 in the identified OFDM symbol based on the resource elements (or subcarriers) on which they are mapped. For example, the RE demapper 1230 may parse the peak suppression symbols 1204 from subcarriers 0-5 of symbol index 1 of FIG. 7B.

In implementations in which the receiving device is a base station, for example, the RE demapper 1230 may parse the A-S symbols 1202 and the peak suppression symbols 1204 from one or more OFDM symbols of an uplink subframe. In some cases, the peak suppression symbols 1204 (depicted as RPSIM) may be slotted between a first PUSCH carrying data and a reference signal (e.g., a pilot signal) and a second PUSCH, for example, between the first PUSCH carrying data and pilot signals (e.g., in symbol indices 12 and 13) and the PUSCH (e.g., in symbol index 10) immediately following a second DMRS (e.g., in symbol index 9). The A-S symbols 1202 are mapped to the remaining OFDM symbols, with the exception of symbol index 0 (which carries a first DMRS). Accordingly, the RE demapper 1230 may identify the peak suppression symbols 1204 based on the positions of the second DMRS and the PUSCH carrying data and pilots. The RE demapper 1230 may further identify the A-S symbols 1202 based on the positions of the first and second DMRS.

The demodulator 1260 may map (or, e.g., demap) the equalized PS (EPS) symbols 1205 to an RPSIM 1206, for example, using digital demodulation techniques. For example, the demodulator 1260 may reverse the modulation performed by the modulator 1180 of FIG. 11. The RPSIM decoder 1270 decodes the RPSIM 1206 to recover peak suppression information 1207. As described with reference to FIG. 11, the peak suppression information 1207 may include the positions, amplitudes, or phases of each peak associated with the A-S symbols 1202. In some implementations, information in the RPSIM 1206 may be compressed. Accordingly, the RPSIM decoder 1270 may generate the peak suppression information 1207 by decompressing the RPSIM 1206. For example, the RPSIM decoder 1270 may reverse any compression performed by the RPSIM generator 1175 of FIG. 11.

In some implementations, the amplitudes of the peaks may be quantized in the RPSIM 1206. For example, the peaks 602 of FIG. 6A may be mapped to a limited number of quantization levels. As a result, multiple peaks 602 may have the same quantized amplitude. Returning to FIG. 12, in some implementations, the RPSIM decoder 1270 may determine the quantized amplitude of each of the peaks 602 based on quantization information received from the transmitting device. As described with reference to FIG. 11, for example, the quantization information may indicate the range of amplitudes associated with the respective quantization levels or an average (mean or median) amplitude of the peaks associated with each quantization level. The RPSIM decoder 1270 of FIG. 12 may determine a quantized amplitude to represent each quantization level based on the quantization information and associate the quantized amplitudes with respective peaks based on the mapping indicated in the RPSIM 1206.

In some implementations, the positions of at least some of the peaks may be represented as differential values in the RPSIM 1206. As described with reference to FIG. 11, for example, the RPSIM 1206 may include the individual position of only one of the peaks in each quantization level (e.g., the "initial peak position"). The position of each of the remaining peaks may be represented by its distance to the previous peak position. The RPSIM decoder 1270 may determine the positions of these peaks by summing or integrating the differential values indicated in the RPSIM 1206. With reference to FIG. 6A, for example, position $s_1$ may represent the initial peak position. The position of the second peak may be determined by adding the difference between the positions of the first and second peaks to the initial peak position $s_1$.

As shown in the example RX chain 1200 of FIG. 12, the peak generator 1280 may be configured to recreate one or more peaks 1208 based on the peak suppression information 1207. Each of the peaks 1208 may correspond to a respective sample of the original data signal having an amplitude that exceeds a threshold amplitude level. In some implementations, the peak generator 1280 may recreate the peaks 1208 in a manner such that they can be substituted for corresponding samples in the amplitude-suppressed data signal. For example, the amplitude of each peak 1208 may represent the peak amplitude of the corresponding sample from the original data signal. In some other implementations, the peak generator 1280 may recreate the peaks 1208 in a manner such that they can be combined or added to the corresponding samples in the amplitude-suppressed data signal. For example, the amplitude of each peak 1208 may represent a difference between the peak amplitude and the suppressed amplitude of the corresponding sample.

The FFT 1290 converts the peaks 1208 from the time domain back to the frequency domain. For example, the FFT 1290 may produce a sequence of frequency domain peaks 1218 representative of the peaks 1208 generated by the peak generator 1280. In some aspects, the peaks 1208 may be parallelized (by a serial-to-parallel converter, not shown) at the input of the FFT 1290, and the resulting frequency domain peaks 1218 may be serialized (by a parallel-to-serial converter, not shown) at the output of the FFT 1290.

The frequency domain peaks 1218 are then combined with equalized A-S(EAS) symbols 1203 to produce reconstructed data symbols 1209. With reference for example to FIG. 11, the data symbols 1209 may correspond to the original data symbols 1101 to be transmitted by the TX chain 1100. The manner in which the EAS symbols 1203 and the frequency domain peaks 1218 are combined may depend on the peaks 1208 that are generated. For example, if the amplitudes of the peaks 1208 represent full peak amplitudes, then the frequency domain peaks 1218 may be substituted for (or replace) corresponding samples in the EAS symbols 1203. Alternatively, if the amplitudes of the peaks 1208 represent differences between the peak amplitudes and the suppressed amplitudes, the frequency domain peaks 1218 may be added to the corresponding samples in the EAS symbols 1203.

MIMO implementations of the RX chain 1200 may additionally include a number (N) of first FFTs 1220 and an inverse precoder (not shown). The inverse precoder reverses the precoding performed by the precoder 1110 of FIG. 11. For example, the inverse precoder may apply an inverse of a precoding matrix 1112 (described with reference to FIG. 11) to the data symbols 1213-1213(N). In some implementations, the inverse precoder may receive an indication of a precoding matrix (e.g., the precoding matrix 1112, as described with reference to FIG. 11) from the transmitting device. For example, the indication may be included in DCI messages received on a per-slot basis. As another example, the indication may be included in MAC CEs received periodically after a given number (M) of slots. As a further example, the indication may be based on a PMI received from the transmitting device.

For MIMO implementations, the RX chain 1200 may perform substantially the same operations as the non-MIMO implementations of the RX chain 1200 on multiple concurrent or parallel streams of OFDM symbols 1201. For example, the N FFTs 1220 may simultaneously convert N streams of OFDM symbols 1201-1201(N) to N streams of frequency domain symbols 1211-1211(N), respectively. The RE demapper 1230 may parse peak suppression symbols 1204 and N streams of A-S symbols 1202-1202(N) from the N streams of frequency domain symbols 1211-1211(N), and the first equalizer 1240 may perform equalization on the N streams of A-S symbols 1202-1202(N) to produce N streams of EAS symbols 1203-1203(N), respectively. The second equalizer 1250 may perform equalization on the peak suppression symbols 1204 to produce EPS symbols 1205, the demodulator 1260 may map the EPS symbols 1205 to an RPSIM 1206, and the RPSIM decoder 1270 may extract or recover peak suppression information 1207 from the RPSIM 1206. The peak generator 1280 may generate peaks 1208 for N data streams based on the peak suppression information (PS Info.) 1207, and the FFT 1290 may convert the peaks 1208 to frequency domain peaks 1218 for the N data streams. The frequency domain peaks 1218 may then be combined with N streams of EAS symbols 1203-1203(N) to produce N streams of reconstructed data symbols 1209-1209(N), respectively.

In some implementations of the RX chain 1200, the demodulator 1260 may map (or, e.g., demap) the EPS symbols 1205 to an RPSIM 1206, for example, using digital demodulation techniques. For example, the demodulator 1260 may reverse the modulation performed by the modulator 1180 of FIG. 11 to demodulate the RPSIM 1206 and pass information including the RPSIM 1206 (e.g., identifying a subset of peaks to be reconstructed during a first stage of a hybrid peak reconstruction procedure) to the RPSIM decoder 1270. The RPSIM decoder 1270 may decode the RPSIM 1206 to recover peak suppression information 1207. As described with reference to FIG. 11, the peak suppression information 1207 obtained from the RPSIM 1206 may include the positions, amplitudes, or phases of each peak of a first subset of peaks associated with the A-S symbols 1202 for the receiving device to reconstruct using the RPSIM 1206 in the first stage of the of the hybrid peak reconstruction procedure.

In some cases, the RPSIM decoder 1270 may extract or recover peak suppression information 1207 from the RPSIM 1206, and the RPSIM decoder 1270 may pass information to the peak generator 1280 that indicates the peak suppression information 1207 (e.g., identifying the first subset of peaks that the receiving device is to reconstruct according to the RPSIM 1206). The peak generator 1280 may generate the N peaks 1208-1208(N) of the first subset of peaks based on the RPSIM 1206, and the FFT 1290 may convert the N peaks 1208-1208(N) to frequency domain peaks 1218-1218(N). The N frequency domain peaks 1218-1218(N) may then be combined with N EAS symbols 1203-1203(N) to produce N reconstructed data symbols 1209-1209(N) for a partially reconstructed data signal, for example, the N reconstructed data symbols 1209-1209(N) corresponding to the first subset of peaks may be reconstructed based on the RPSIM 1206 so that the reconstructed peaks of the N reconstructed data symbols 1209-1209(N) accurately reflect corresponding peaks of an original data signal that the transmitting device may have reduced before transmission (e.g., to reduce PAPR).

Thus, according to the first stage of the hybrid peak reconstruction procedure, the reconstructed data symbols 1209 may include reconstructed samples of the data signal for the first subset of peaks, and the reconstructed data symbols 1209 may then be passed to the peak reconstruction circuit 1222 to recreate a second subset of peaks during a second stage of the hybrid peak reconstruction procedure. In the second stage of the hybrid peak reconstruction procedure, the peak reconstruction circuit 1222 may implement a decision-directed peak reconstruction process to reconstruct the second subset of peaks. For example, the peak reconstruction circuit 1222 may implement an iterative digital demodulation procedure to identify and recover the second subset of peaks, where the second subset of peaks may be distinct from the first subset of peaks (e.g., identified via the RPSIM 1206), and together with the first subset of peaks, may include all or substantially all of the set of peaks reduced by the transmitting device.

In some cases, the OFDM symbols 1201 received via the receiver 1210 may include information indicating a clipping threshold (e.g., via a PDCCH, PDSCH, or other type of signaling). The information indicating the clipping threshold may be passed to the RE demapper 1230 (e.g., via the FFT 1220), for example, via control information (e.g., via a PDCCH, in DCI, in a MAC CE, etc.), and the RE demapper 1230 may pass the indication of the clipping threshold onto the peak reconstruction circuit 1222 (e.g., using data symbols via the equalizer 1240). Additionally or alternatively, the information indicating the clipping threshold may be included in, for example, an RPSIM, and thus the RE demapper 1230 may pass peak suppression information including the RPSIM and the information indicating the clipping threshold to the RPSIM decoder 1270 (e.g., via the equalizer 1250 and the demodulator 1260). In this case, the RPSIM decoder 1270 may recover the information indicating the clipping threshold from decoding the RPSIM, and the RPSIM decoder 1270 may then pass the indication of the clipping threshold to the peak reconstruction circuit 1222 (e.g., via the peak generator 1280 and the FFT 1290).

Based on receiving the information indicating the clipping threshold, the peak reconstruction circuit 1222 may determine, based on the clipping threshold, an amplitude threshold, for example, the amplitude threshold 604 as shown and described with reference to FIG. 6. The peak reconstruction circuit 1222 may then configure the amplitude threshold accordingly. For example, based on the clipping threshold, the peak reconstruction circuit 1222 may configure the amplitude threshold to be at a level such that the peak reconstruction circuit 1222 properly stops performing further iterations of the digital demodulation procedure for the second subset of peaks once an amplitude of the peak satisfies the amplitude threshold, for example, as described with reference to FIG. 11.

In some examples, according to the second stage of the hybrid peak reconstruction procedure, the peak reconstruction circuit 1222 reconstructs the peaks of the second subset of peaks using a Bussgang decomposition-based peak reconstruction procedure. This digital demodulation procedure may involve estimating the remaining non-linear distortion in the partially reconstructed signal by first slicing a first scaled version of an estimate of the partially reconstructed signal (e.g., scaled by a Bussgang coefficient α) and then applying the same non-linearity (e.g., clipping) used at transmitting device to the sliced signal. As discussed above, in some examples, the first scaled version of the estimate is: $y_{corrected}/\alpha$. An estimate of the remaining non-linear distortion may then be obtained from this result by adding the RPSIM peaks signal (after equalization) and removing a second scaled version of the sliced signal. As discussed above, in some examples, the second scaled version of the estimate is: $\alpha \hat{x}$.

After performing one or more iterations of the digital demodulation procedure for the second stage of the hybrid peak reconstruction procedure, the peak reconstruction circuit 1222 may use values obtained from the digital demodulation procedure for the decision-directed peak reconstruction process to reconstruct the second subset of peaks (e.g., as described with reference to FIG. 11). Accordingly, the receiving device may recreate the first subset of peaks using the RPSIM and the second subset of peaks using the digital demodulation procedure. The peak reconstruction circuit 1222 may proceed to reconstruct data symbols 1213 corresponding to the second subset of peaks so that the reconstructed peaks accurately reflect corresponding peaks of the original data signal that the transmitting device may have reduced before transmission (e.g., to reduce PAPR).

The receiving device may combine or add the recreated second subset of peaks to the corresponding samples of the previously partially recreated data signal and substitute these samples with the respective samples of the data signal. Using the first subset of peaks and the second subset of peaks, the receiving device may produce reconstructed data symbols with peaks that reflect (e.g., substantially) the peaks of the original data signal before it was transmitted by the transmitting device. The peak reconstruction circuit 1222 may then pass information including the substantially reconstructed data symbols to a modem (not shown), for example, to demodulate and decode information included in the reconstructed data symbols and to utilize the information appropriately.

In some implementations, the receiving device may indicate to the transmitting device that it is capable of decoding or otherwise interpreting the peak suppression symbols 1204 (or RPSIM 1206) prior to receiving the OFDM symbols 1201. For example, the receiving device may transmit capability information to the transmitting device, where the capability information may indicate an ability of the receiving device to receive and decode peak suppression symbols 1204 (or, e.g., A-S symbols 1202). In some cases, the capability information may be provided as a capability bit in an RRC message sent from the receiving device to the transmitting device, for example, as described with reference to FIG. 11. In some other implementations, the receiving device may receive capability information from the transmitting device, where the capability information may indicate an ability of the transmitting device to generate and transmit peak suppression symbols 1204 (or, e.g., A-S symbols 1202). In some cases, such capability information also may be provided as a capability indicator (e.g., one or more capability bits) in a control message (e.g., an RRC message) sent from the transmitting device to the receiving device.

As described with reference to the example downlink subframe configurations of FIGS. 7A and 7B, a PSIM associated with a corresponding data signal may mapped to a set of resources (e.g., a set of one or more REs) such as a special control channel, and, additionally or alternatively, the PSIM may be implemented to occupy a portion of the PDCCH and/or the PDSCH. In some cases, some data signals may include a relatively larger number of peaks than some other data signals. A PSIM that identifies, for example, an amplitude and position of samples for each peak exceeding an amplitude threshold will thus use a correspondingly greater amount of overhead to signal this information for each of the larger number of peaks. Because the PSIM may occupy the special control channel as well as the PDCCH and/or PDSCH for communicating data signals, relatively increased overhead for the PSIM may correspondingly decrease throughput to communicate the data signals.

Accordingly, techniques described herein provide for the use of an RPSIM, for example, in place of a PSIM. Whereas a PSIM may include amplitude and position information for each sample for a number of peaks in a corresponding data signal (e.g., for each peak having an amplitude that exceeds an amplitude threshold), an RPSIM may include such amplitude and position information for a subset of these peaks. For example, an RPSIM may identify samples for a percentage (e.g., 1%), or, alternatively, a predetermined number, of the peaks having amplitudes that satisfy an amplitude threshold (e.g., amplitudes of respective peaks being greater than the amplitude threshold) as compared to a PSIM used for the same corresponding data signal. In this way, the use of an RPSIM may use relatively less overhead than the use of a PSIM for the same corresponding data signal. Accordingly, the use of the RPSIM may also provide for relatively increased throughput for the data signal as compared to the use of the PSIM.

While the RPSIM may identify samples for a subset of a set of peaks in a data signal, each of the set of peaks in the data signal may still be reduced, as described herein. Thus, the RPSIM may provide information to a device (e.g., a UE) receiving the RPSIM for the receiving device to recreate a subset of the peaks of the original data signal (e.g., rather than all of the peaks of the original data signal). Accordingly, techniques are provided herein by which the UE may reconstruct a first subset of peaks in a first stage using the RPSIM, and the UE may reconstruct a second subset of peaks in a second stage using an additional peak reconstruction process. In some cases, this multi-stage peak reconstruction procedure may be referred to as a hybrid peak reconstruction procedure (or, e.g., a hybrid peak reconstruction process, and other like terms).

The second stage of the hybrid peak reconstruction procedure may include, for example, the use of a decision-directed peak reconstruction process. In the decision-directed peak reconstruction process, the UE may implement a digital demodulation procedure to identify and recover the second subset of peaks that may not have been indicated in the RPSIM. In some cases, the decision-directed peak reconstruction process may include multiple iterations of the digital demodulation procedure where the UE iteratively reconstructs the peaks in a successive manner until having identified each peak of the second subset (or at least a portion of which that satisfies a threshold or other criteria indicating to the UE not to perform further iterations). Accordingly, a transmitting device (e.g., a base station) may adjust (e.g., clip) any number of peaks of a data signal to reduce its PAPR and signal a subset of these adjusted peaks to a receiving device (e.g., a UE) in an RPSIM, and according to the two stage procedure described herein, the receiving device may reconstruct all or substantially all of the peaks that were reduced to recover and process the information from the originally transmitted data signal while maintaining the relatively improved throughput for such data signal communications.

Figure 13:
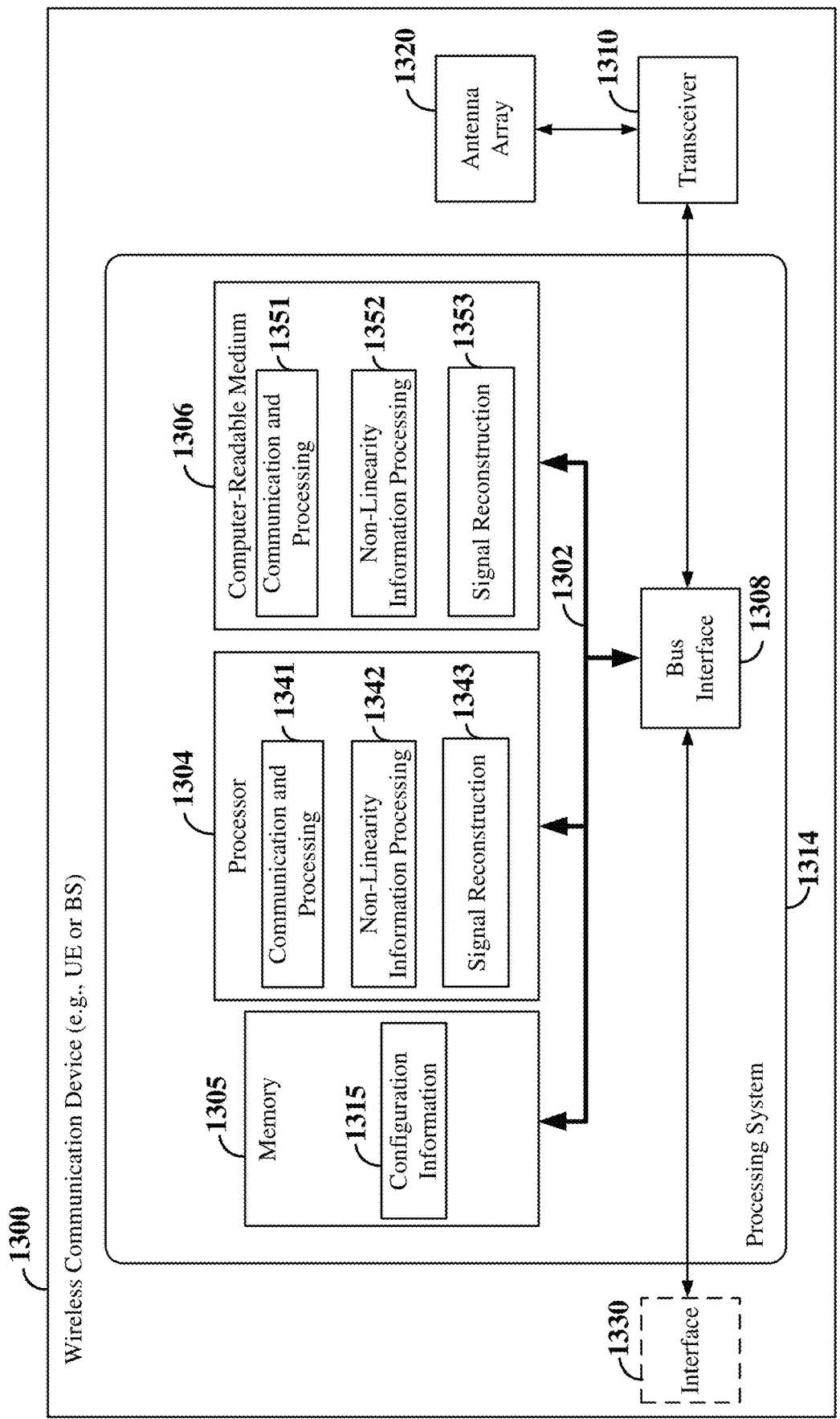
FIG. 13 is a block diagram illustrating an example of a hardware implementation for a wireless communication device (e.g., a user equipment or a base station) employing a processing system according to some aspects.

FIG. 13 is a block diagram illustrating an example of a hardware implementation for a wireless communication device 1300 employing a processing system 1314. In some examples, the wireless communication device 1300 may be a UE or scheduled entity configured to wirelessly communicate with a base station or scheduling entity, as discussed in any one or more of FIGS. 1-12. In this case, the wireless communication device 1300 may correspond to any of the UEs or scheduled entities shown in any of FIGS. 1 and 2. In some examples, the wireless communication device 1300 may be a base station or scheduling entity configured to wirelessly communicate with a UE or scheduled entity, as discussed in any one or more of FIGS. 1-12. In this case, the wireless communication device 1300 may correspond to any of the base stations or scheduling entities shown in any of FIGS. 1 and 2.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1300 may be configured to perform any one or more of the functions described herein. That is, the processor 1304, as utilized in a wireless communication device 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 an antenna array 1320, and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the wireless communication device 1300 or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as a base station.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store configuration information 1315 (e.g., parameters associated with peak reconstruction as discussed herein) used by the processor 1304 in cooperation with the transceiver 1310 to transmit uplink control information.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1300 may be configured to perform any one or more of the operations described herein (e.g., as described above in conjunction with FIGS. 1-12 and as described below in conjunction with FIGS. 14-15). In some aspects of the disclosure, the processor 1304, as utilized in the wireless communication device 1300, may include circuitry configured for various functions.

The processor 1304 may include communication and processing circuitry 1341. In examples where the wireless communication device 1300 is a scheduled entity (e.g., a UE), the communication and processing circuitry 1341 may be configured to communicate with a scheduling entity such as a base station. In examples where the wireless communication device 1300 is a scheduling entity (e.g., a base station), the communication and processing circuitry 1341 may be configured to communicate with a scheduled entity such as a UE. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains, each configured to process signals in a different RAT (or RAN) type. The communication and processing circuitry 1341 may further be configured to execute communication and processing software 1351 included on the computer-readable medium 1306 to implement one or more functions described herein.

In some implementations where the communication involves receiving information, the communication and processing circuitry 1341 may obtain information from a component of the wireless communication device 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving (e.g., a means for receiving a data signal). In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for encoding.

In some examples, the communication and processing circuitry 1341 may include functionality for a means for receiving a data signal. For example, the communication and processing circuitry 1341 and the transceiver 1310, shown and described above in connection with FIG. 13, may be configured to receive the clipped data signal 802 of FIG. 8 (e.g., to receive y(x) of Table 1) from a transmitting device via a scheduled resource (e.g., PDSCH or PUSCH).

In some examples, the communication and processing circuitry 1341 may include functionality for a means for receiving an indication of at least part of a non-linear distortion. For example, the communication and processing circuitry 1341 and the transceiver 1310, shown and described above in connection with FIG. 13, may be configured to receive the RPSIM 804 of FIG. 8 from a transmitting device via a scheduled resource (e.g., PDSCH or PUSCH).

The processor 1304 may include non-linearity information processing circuitry 1342 configured to perform non-linearity information processing-related operations as discussed herein (e.g., one or more of the clipping-related operations described in conjunction with FIGS. 5-12). The non-linearity information processing circuitry 1342 may be configured to execute non-linearity information processing software 1352 included on the computer-readable medium 1306 to implement one or more functions described herein.

In some examples, the non-linearity information processing circuitry 1342 may include functionality for a means for receiving an indication of at least part of a non-linear distortion. For example, the non-linearity information processing circuitry 1342 may be configured to receive an RPSIM. The non-linearity information processing circuitry 1342 may also be configured to decode the RPSIM to determine amplitude and position information for clipped peaks of a received data signal.

In some examples, the non-linearity information processing circuitry 1342 may include functionality for a means for generating a reconstruction of at least part of a non-linear distortion. For example, the non-linearity information processing circuitry 1342 may be configured to decompress clipping information included in an RPSIM to identify the magnitudes and positions of a first subset clipped peaks and reconstruct these peaks (e.g., to provide the SI parameter of Table 1). In some examples, the signal reconstruction circuitry 1343 may be configured to perform the operations of the peak signal generator circuit 806 discussed above in conjunction with FIG. 8. In some examples, the non-linearity information processing circuitry 1342 may be configured to perform one or more of the operations of the demapper 1230, the equalizer 1250, the demodulator 1260, the RPSIM decoder 1270, or the peak generator 1280 discussed above in conjunction with FIG. 12.

The processor 1304 may include signal reconstruction circuitry 1343 configured to perform signal reconstruction-related operations as discussed herein (e.g., one or more of the peak reconstruction-related operations described in conjunction with FIGS. 5-12). The signal reconstruction circuitry 1343 may be configured to execute signal reconstruction software 1353 included on the computer-readable medium 1306 to implement one or more functions described herein.

In some examples, the signal reconstruction circuitry 1343 may include functionality for a means for combining a data signal and a reconstruction. For example, the signal reconstruction circuitry 1343 may be configured to add reconstructed peaks to a clipped data signal (e.g., taking into account the delay of the channel). In some examples, the signal reconstruction circuitry 1343 may be configured to perform the Correction phase of Table 1. In some examples, the signal reconstruction circuitry 1343 may be configured to perform the operations of the RPSIM-based reconstruction circuit 810 discussed above in conjunction with FIG. 8. In some examples, the signal reconstruction circuitry 1343 may be configured to perform one or more of the combining operations for the frequency domain peaks 1218 and the EAS symbols 1203 discussed above in conjunction with FIG. 12.

In some examples, the signal reconstruction circuitry 1343 may include functionality for a means for scaling a first reconstructed signal. For example, the signal reconstruction circuitry 1343 may be configured to divide a first reconstructed signal by a Bussgang coefficient (a). In some examples, the signal reconstruction circuitry 1343 may be configured to perform the scaling operation of the Decision phase of Table 1.

In some examples, the signal reconstruction circuitry 1343 may include functionality for a means for slicing. For example, the signal reconstruction circuitry 1343 may be configured to determine the distance vector between an estimate of a received signal and the expected constellation points for that signal. In some examples, the signal reconstruction circuitry 1343 may be configured to perform the Decision phase of Table 1. n some examples, the signal reconstruction circuitry 1343 may be configured to perform the FFT operation, the slicing operation, and the IFFT operation shown in the Decision operation of Table 1. In some examples, the signal reconstruction circuitry 1343 may be configured to perform the slicing operations of the autonomous reconstruction circuit 814 discussed above in conjunction with FIG. 8. In some examples, the signal reconstruction circuitry 1343 may be configured to perform the slicing operations of the peak reconstruction circuit 1222 discussed above in conjunction with FIG. 12.

In some examples, the signal reconstruction circuitry 1343 may include functionality for a means for scaling a sliced signal. For example, the signal reconstruction circuitry 1343 may be configured to multiply a sliced signal by a Bussgang coefficient (a). In some examples, the signal reconstruction circuitry 1343 may be configured to perform the scaling operation of the Estimation phase of Table 1.

In some examples, the signal reconstruction circuitry 1343 may include functionality for a means for applying a non-linear distortion function. For example, the signal reconstruction circuitry 1343 may be configured to modify the sliced signal to remove any peaks above a threshold level (e.g., the same threshold used by a transmitting device that transmitted a clipped signal). In some examples, the signal reconstruction circuitry 1343 may be configured to perform the clipping operation of the Estimation phase of Table 1. In some examples, the signal reconstruction circuitry 1343 may be configured to perform the clipping operations of the autonomous reconstruction circuit 814 discussed above in conjunction with FIG. 8. In some examples, the signal reconstruction circuitry 1343 may be configured to perform the clipping operations of the peak reconstruction circuit 1222 discussed above in conjunction with FIG. 12.

In some examples, the signal reconstruction circuitry 1343 may include functionality for a means for generating an estimate of a non-linear distortion component. For example, the signal reconstruction circuitry 1343 may be configured to perform the Estimation phase of Table 1. In some examples, the signal reconstruction circuitry 1343 may be configured to iteratively execute the procedure of Table 1 to determine d. In some examples, the signal reconstruction circuitry 1343 may be configured to perform the non-linear distortion estimation operations of the autonomous reconstruction circuit 814 discussed above in conjunction with FIG. 8. In some examples, the signal reconstruction circuitry 1343 may be configured to perform the non-linear distortion estimation operations of the peak reconstruction circuit 1222 discussed above in conjunction with FIG. 12.

In some examples, the signal reconstruction circuitry 1343 may include functionality for a means for generating a reconstructed signal. For example, the signal reconstruction circuitry 1343 may be configured to perform the Correction phase of Table 1. In some examples, the signal reconstruction circuitry 1343 may be configured to iteratively execute the procedure of Table 1 to determine $y_{corrected}$. In some examples, the signal reconstruction circuitry 1343 may be configured to perform the reconstruction operations of the autonomous reconstruction circuit 814 discussed above in conjunction with FIG. 8. In some examples, the signal reconstruction circuitry 1343 may be configured to perform the reconstruction operations of the peak reconstruction circuit 1222 discussed above in conjunction with FIG. 12.

Figure 14:
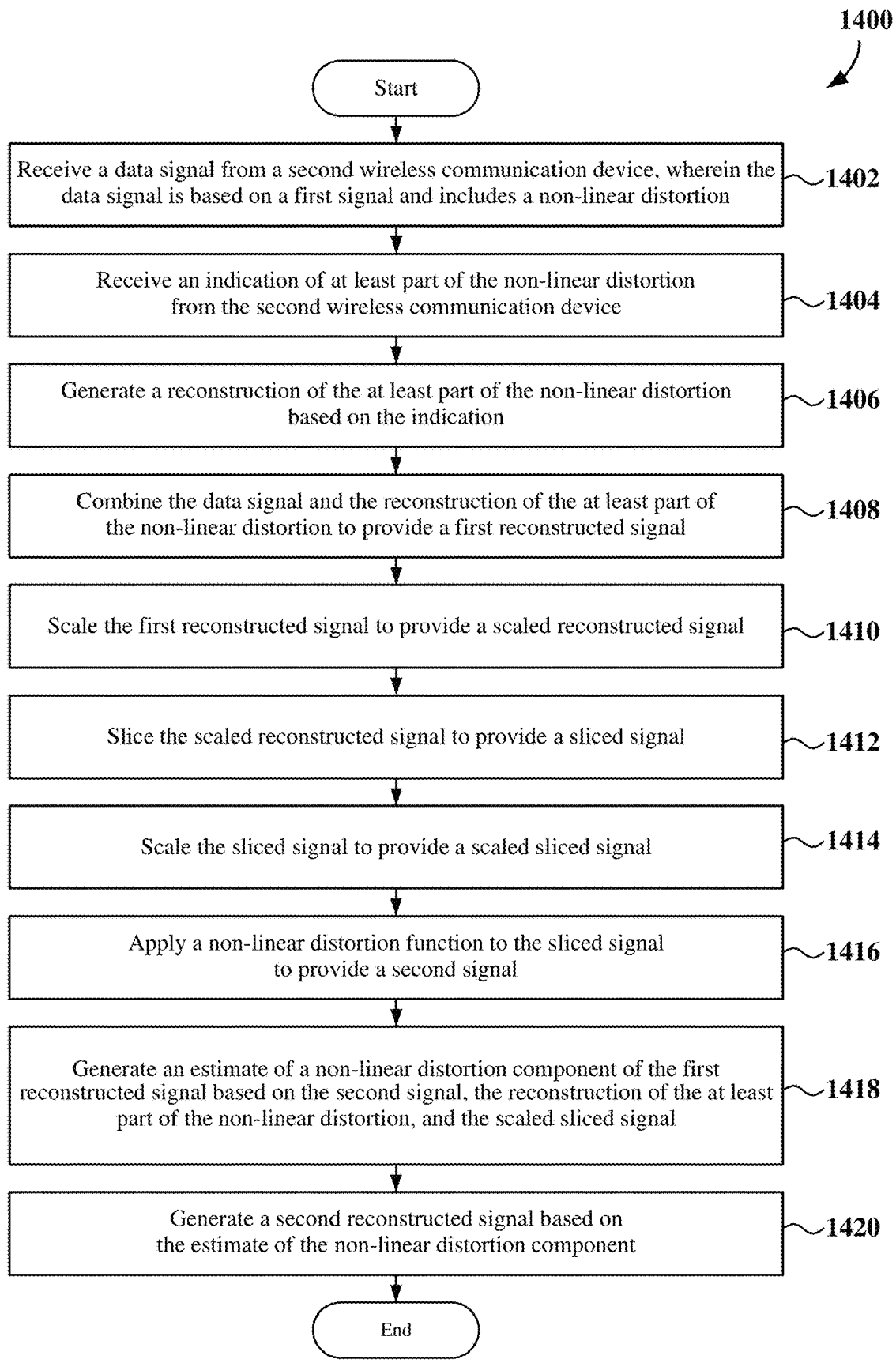
FIG. 14 is a flowchart illustrating an example process for reconstructing a signal according to some aspects.

FIG. 14 is a flow chart illustrating an example method 1400 for wireless communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the wireless communication device 1300 illustrated in FIG. 13. In some examples, the method 1400 may be carried out by any suitable apparatus or means for carrying out the functions or algorithm described below.

At block 1402, a first wireless communication device may receive a data signal from a second wireless communication device, wherein the data signal is based on a first signal and includes a non-linear distortion. In some examples, the non-linear distortion may be due to clipping of the first signal. In some examples, the communication and processing circuitry 1341 and the transceiver 1310, shown and described above in connection with FIG. 13, may provide a means to receive a data signal from a second wireless communication device, wherein the data signal is based on a first signal and includes a non-linear distortion.

At block 1404, the first wireless communication device may receive an indication of at least part of the non-linear distortion from the second wireless communication device. In some examples, the indication may indicate at least a part of the clipping of the first signal. In some examples, the indication may indicate at least one amplitude and at least one position within the clipped data signal for at least one clipped peak. In some examples, the non-linearity information processing circuitry 1342 together with the communication and processing circuitry 1341 and the transceiver 1310, shown and described above in connection with FIG. 13, may provide a means to receive an indication of at least part of the non-linear distortion from the second wireless communication device.

At block 1406, the first wireless communication device may generate a reconstruction of the at least part of the non-linear distortion based on the indication. In some examples, the non-linearity information processing circuitry 1342 may provide a means to generate a reconstruction of the at least part of the non-linear distortion based on the indication.

At block 1408, the first wireless communication device may combine the data signal and the reconstruction of the at least part of the non-linear distortion to provide a first reconstructed signal. In some examples, the signal reconstruction circuitry 1343 may provide a means to combine the data signal and the reconstruction of the at least part of the non-linear distortion to provide a first reconstructed signal.

In some examples, to combine the data signal and the reconstruction of the at least part of the non-linear distortion, the first wireless communication device may replace at least one sample of the data signal with the reconstruction of the at least part of the non-linear distortion. In some examples, to combine the data signal and the reconstruction of the at least part of the non-linear distortion, the first wireless communication device may replace at least one sample of a clipped data signal with a reconstruction of at least one peak.

At block 1410, the first wireless communication device may scale the first reconstructed signal to provide a scaled reconstructed signal. In some examples, the scaling may include Bussgang scaling that uses a Bussgang coefficient. In some examples, the signal reconstruction circuitry 1343, shown and described above in connection with FIG. 13, may provide a means to scale the first reconstructed signal to provide a scaled reconstructed signal.

At block 1412, the first wireless communication device may slice the scaled reconstructed signal to provide a sliced signal. In some examples, the first wireless communication device may perform hard slicing. In some examples, the first wireless communication device may perform soft slicing. In some examples, the first wireless communication device may perform transparent slicing. In some examples, the slicing of the first reconstructed signal by the first wireless communication device may include applying a fast Fourier transform to the scaled reconstructed signal to provide a frequency domain signal, slicing the frequency domain signal to provide a sliced frequency domain signal, and applying an inverse fast Fourier transform to the sliced frequency domain signal to provide a time domain signal. In some examples, the signal reconstruction circuitry 1343, shown and described above in connection with FIG. 13, may provide a means to slice the scaled reconstructed signal to provide a sliced signal.

At block 1414, the first wireless communication device may scale the sliced signal to provide a scaled sliced signal. In some examples, the first wireless communication device may perform Bussgang scaling that uses a Bussgang coefficient to provide a scaled sliced signal. In some examples, the signal reconstruction circuitry 1343, shown and described above in connection with FIG. 13, may provide a means to scale the sliced signal to provide a scaled sliced signal.

At block 1416, the first wireless communication device may apply a non-linear distortion function to the sliced signal to provide a second signal. In some examples, the signal reconstruction circuitry 1343, shown and described above in connection with FIG. 13, may provide a means to apply a non-linear distortion function to the sliced signal to provide a second signal.

In some examples, the application of the non-linear distortion function to the sliced signal by the first wireless communication device may include clipping the sliced signal. In some examples, the application of the non-linear distortion function to the sliced signal by the first wireless communication device may include applying a threshold (e.g., a clipping threshold) to the sliced signal. In some examples, the first wireless communication device may receive a set of parameters indicative of the non-linear distortion function from the second wireless communication device. In some examples, the set of parameters may include a clipping threshold.

At block 1418, the first wireless communication device may generate an estimate of a non-linear distortion component of the first reconstructed signal based on the second signal, the reconstruction of the at least part of the non-linear distortion, and the scaled sliced signal. In some examples, the generation of the estimate of the non-linear distortion component of the first reconstructed signal by the first wireless communication device may include adding the reconstruction of the at least part of the non-linear distortion to the second signal to provide a third signal, and subtracting the scaled sliced signal from the third signal. In some examples, the signal reconstruction circuitry 1343, shown and described above in connection with FIG. 13, may provide a means to generate an estimate of a non-linear distortion component of the first reconstructed signal based on the second signal, the reconstruction of the at least part of the non-linear distortion, and the scaled sliced signal.

At block 1420, the first wireless communication device may generate a second reconstructed signal based on the estimate of the non-linear distortion component. In some examples, the signal reconstruction circuitry 1343, shown and described above in connection with FIG. 13, may provide a means to generate a second reconstructed signal based on the estimate of the non-linear distortion component.

In some examples, the first wireless communication device may perform an iterative process that includes the slicing the first reconstructed signal, the performing the non-linear distortion function on the sliced signal, and the generating the estimate of the non-linear distortion component. In some examples, the iterative process may include a Bussgang decomposition algorithm. In some examples, the first wireless communication device may perform iterations of the iterative process a defined number of times. In some examples, the first wireless communication device may cease the iterative process when an error associated with the slicing is below a threshold error level.

In some examples, the iterative process performed by the first wireless communication device may include generating a corrected signal based on the estimate of the non-linear distortion component, scaling the corrected signal to provide a scaled corrected signal, slicing the scaled corrected signal to provide a second sliced signal, scaling the second sliced signal to provide a second scaled sliced signal, applying a non-linear distortion function on the second sliced signal to provide a third signal, generating a second estimate of the non-linear distortion component of the corrected signal based on the third signal, the reconstruction of the at least part of the non-linear distortion, and the second scaled sliced signal, and generating a third reconstructed signal based on the second estimate of the non-linear distortion component.

Figure 15:
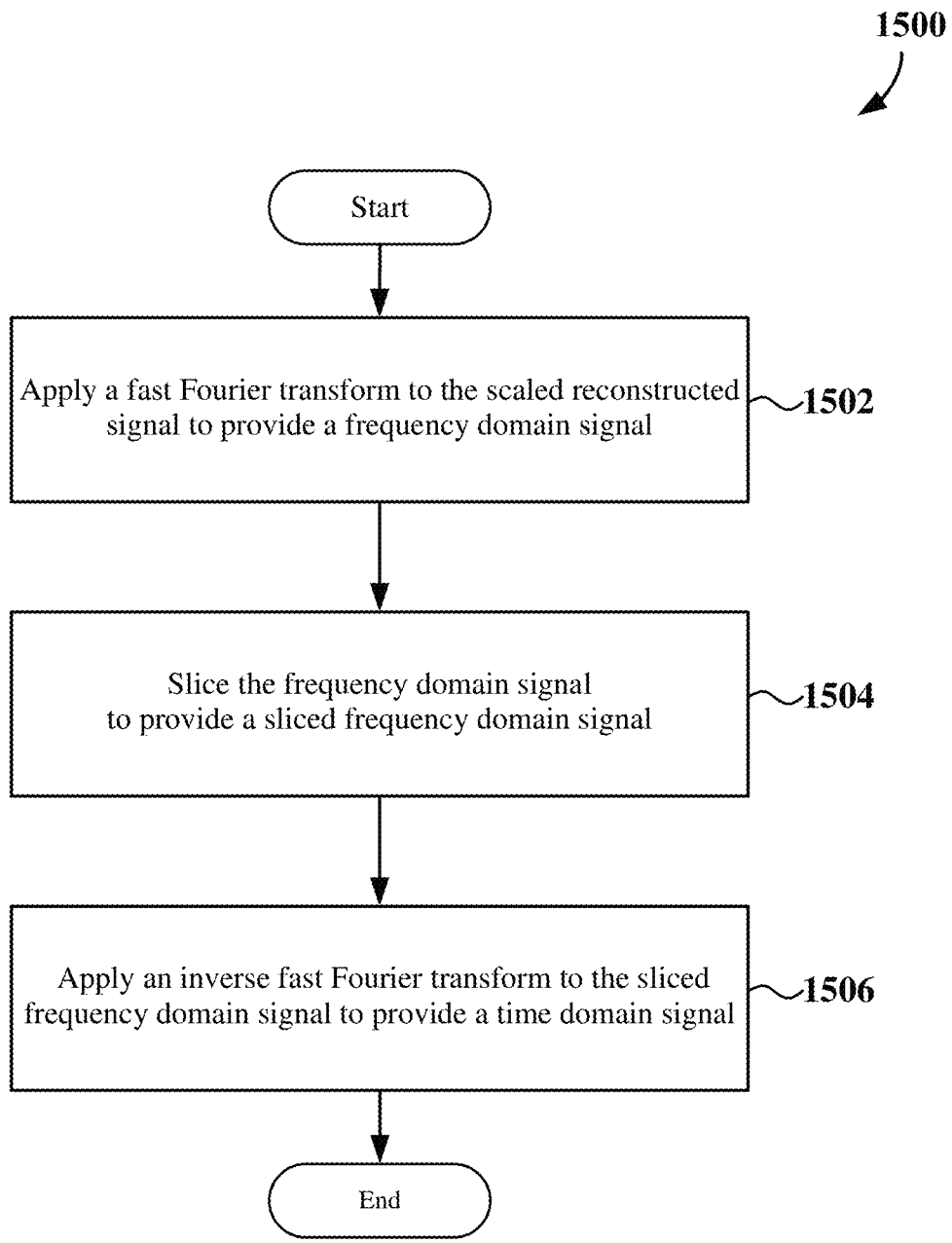
FIG. 15 is a flowchart illustrating an example process for slicing a signal according to some aspects.

FIG. 15 is a flow chart illustrating an example method 1500 for wireless communication in accordance with some aspects of the present disclosure. In some examples, one or more aspects of the method 1500 may be implemented in conjunction with (e.g., as part of and/or in addition to) the method 1400 of FIG. 14. As described below, some or all illustrated features may be omitted in a particular implementation within the scope of the present disclosure, and some illustrated features may not be required for implementation of all examples. In some examples, the method 1500 may be carried out by the wireless communication device 1300 illustrated in FIG. 13. In some examples, the method 1500 may be carried out by any suitable apparatus or means for carrying out the functions or algorithm described below.

At block 1502, a first wireless communication device may apply a fast Fourier transform to the scaled reconstructed signal to provide a frequency domain signal. In some examples, the signal reconstruction circuitry 1343, shown and described above in connection with FIG. 13, may provide a means to apply a fast Fourier transform to the scaled reconstructed signal to provide a frequency domain signal.

At block 1504, the first wireless communication device may slice the frequency domain signal to provide a sliced frequency domain signal. In some examples, the signal reconstruction circuitry 1343, shown and described above in connection with FIG. 13, may provide a means to slice the frequency domain signal to provide a sliced frequency domain signal.

At block 1506, the first wireless communication device may apply an inverse fast Fourier transform to the sliced frequency domain signal to provide a time domain signal. In some examples, the signal reconstruction circuitry 1343, shown and described above in connection with FIG. 13, may provide a means to apply an inverse fast Fourier transform to the sliced frequency domain signal to provide a time domain signal.

In one configuration, the wireless communication device 1300 includes means for receiving a data signal from a second wireless communication device, wherein the data signal is based on a first signal and comprises a non-linear distortion, means for receiving an indication of at least part of the non-linear distortion from the second wireless communication device, means for generating a reconstruction of the at least part of the non-linear distortion based on the indication, means for combining the data signal and the reconstruction of the at least part of the non-linear distortion to provide a first reconstructed signal, means for scaling the first reconstructed signal to provide a scaled reconstructed signal, means for slicing the scaled reconstructed signal to provide a sliced signal, means for scaling the sliced signal to provide a scaled sliced signal, means for applying a non-linear distortion function to the sliced signal to provide a second signal, means for generating an estimate of a non-linear distortion component of the first reconstructed signal based on the second signal, the reconstruction of the at least part of the non-linear distortion, and the scaled sliced signal, and means for generating a second reconstructed signal based on the estimate of the non-linear distortion component. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 5, 8, 11, 12, and 13, and utilizing, for example, the processes and/or algorithms described herein in relation to FIGS. 14-15.

The methods shown in FIGS. 14-15 may include additional aspects, such as any single aspect or any combination of aspects described below and/or in connection with one or more other processes described elsewhere herein. The following provides an overview of several aspects of the present disclosure.

Aspect 1: A method for wireless communication at a first wireless communication device, the method comprising: receiving a data signal from a second wireless communication device, wherein the data signal is based on a first signal and comprises a non-linear distortion; receiving an indication of at least part of the non-linear distortion from the second wireless communication device; generating a reconstruction of the at least part of the non-linear distortion based on the indication; combining the data signal and the reconstruction of the at least part of the non-linear distortion to provide a first reconstructed signal; scaling the first reconstructed signal to provide a scaled reconstructed signal; slicing the scaled reconstructed signal to provide a sliced signal; scaling the sliced signal to provide a scaled sliced signal; applying a non-linear distortion function to the sliced signal to provide a second signal; generating an estimate of a non-linear distortion component of the first reconstructed signal based on the second signal, the reconstruction of the at least part of the non-linear distortion, and the scaled sliced signal; and generating a second reconstructed signal based on the estimate of the non-linear distortion component.

Aspect 2: The method of aspect 1, wherein the non-linear distortion is due to clipping of the first signal.

Aspect 3: The method of aspect 2, wherein the indication indicates at least a part of the clipping of the first signal.

Aspect 4: The method of any of aspects 1 through 3, wherein the scaling comprises Bussgang scaling that uses a Bussgang coefficient.

Aspect 5: The method of any of aspects 1 through 4, wherein the applying the non-linear distortion function to the sliced signal comprises clipping the sliced signal.

Aspect 6: The method of any of aspects 1 through 5, wherein the slicing the scaled reconstructed signal comprises: applying a fast Fourier transform to the scaled reconstructed signal to provide a frequency domain signal; slicing the frequency domain signal to provide a sliced frequency domain signal; and applying an inverse fast Fourier transform to the sliced frequency domain signal to provide a time domain signal.

Aspect 7: The method of any of aspects 1 through 6, wherein the applying the non-linear distortion function to the sliced signal comprises: applying a threshold to the sliced signal.

Aspect 8: The method of any of aspects 1 through 7, further comprising: receiving from the second wireless communication device a set of parameters indicative of the non-linear distortion function.

Aspect 9: The method of aspect 8, wherein the set of parameters comprises a clipping threshold.

Aspect 10: The method of any of aspects 1 through 9, further comprising: performing an iterative process that includes the slicing the first reconstructed signal, the performing the non-linear distortion function on the sliced signal, and the generating the estimate of the non-linear distortion component.

Aspect 11: The method of aspect 10, wherein the iterative process comprises a Bussgang decomposition algorithm.

Aspect 12: The method of any of aspects 10 through 11, wherein the iterative process further comprises: generating a corrected signal based on the estimate of the non-linear distortion component; scaling the corrected signal to provide a scaled corrected signal; slicing the scaled corrected signal to provide a second sliced signal; scaling the second sliced signal to provide a second scaled sliced signal; applying a non-linear distortion function on the second sliced signal to provide a third signal; generating a second estimate of the non-linear distortion component of the corrected signal based on the third signal, the reconstruction of the at least part of the non-linear distortion, and the second scaled sliced signal; and generating a third reconstructed signal based on the second estimate of the non-linear distortion component.

Aspect 13: The method of any of aspects 10 through 12, wherein the performing the iterative process comprises: performing iterations of the iterative process a defined number of times.

Aspect 14: The method of any of aspects 10 through 13, wherein the performing the iterative process comprises: ceasing the iterative process when an error associated with the slicing is below a threshold error level.

Aspect 15: The method of any of aspects 1 through 14, wherein the indication indicates at least one amplitude and at least one position within the data signal for at least one clipped peak.

Aspect 16: The method of any of aspects 1 through 15, wherein the combining the data signal and the reconstruction of the at least part of the non-linear distortion comprises: replacing at least one sample of the data signal with the reconstruction of the at least part of the non-linear distortion.

Aspect 17: The method of any of aspects 1 through 16, wherein the generating the estimate of the non-linear distortion component of the first reconstructed signal comprises: adding the reconstruction of the at least part of the non-linear distortion to the second signal to provide a third signal; and subtracting the scaled sliced signal from the third signal.

Aspect 18: A first wireless communication device comprising: a transceiver configured to communicate with a radio access network, a memory, and a processor communicatively coupled to the transceiver and the memory, wherein the processor and the memory are configured to perform any one of aspects 1 through 17.

Aspect 19: An apparatus configured for wireless communication comprising at least one means for performing any one of aspects 1 through 17.

Aspect 20: A non-transitory computer-readable medium storing computer-executable code, comprising code for causing an apparatus to perform any one of aspects 1 through 17.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 5, 8, and 11-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method for wireless communication at a first wireless communication device, the method comprising:
   receiving a data signal from a second wireless communication device, wherein the data signal is based on a first signal and comprises a non-linear distortion;
   receiving an indication of at least part of the non-linear distortion from the second wireless communication device;
   generating a reconstruction of the at least part of the non-linear distortion based on the indication;
   combining the data signal and the reconstruction of the at least part of the non-linear distortion to provide a first reconstructed signal;
   scaling the first reconstructed signal to provide a scaled reconstructed signal;
   slicing the scaled reconstructed signal to provide a sliced signal;
   scaling the sliced signal to provide a scaled sliced signal;
   applying a non-linear distortion function to the sliced signal to provide a second signal;
   generating an estimate of a non-linear distortion component of the first reconstructed signal based on the second signal, the reconstruction of the at least part of the non-linear distortion, and the scaled sliced signal; and
   generating a second reconstructed signal based on the estimate of the non-linear distortion component.

2. The method of claim 1, wherein the non-linear distortion is due to clipping of the first signal.

3. The method of claim 2, wherein the indication indicates at least a part of the clipping of the first signal.

4. The method of claim 1, wherein the scaling comprises Bussgang scaling that uses a Bussgang coefficient.

5. The method of claim 1, wherein the applying the non-linear distortion function to the sliced signal comprises clipping the sliced signal.

6. The method of claim 1, wherein the slicing the scaled reconstructed signal comprises:
   applying a fast Fourier transform to the scaled reconstructed signal to provide a frequency domain signal;
   slicing the frequency domain signal to provide a sliced frequency domain signal; and
   applying an inverse fast Fourier transform to the sliced frequency domain signal to provide a time domain signal.

7. The method of claim 1, wherein the applying the non-linear distortion function to the sliced signal comprises:
   applying a threshold to the sliced signal.

8. The method of claim 1, further comprising:
   receiving from the second wireless communication device a set of parameters indicative of the non-linear distortion function.

9. The method of claim 8, wherein the set of parameters comprises a clipping threshold.

10. The method of claim 1, further comprising:
    performing an iterative process that includes the slicing the scaled reconstructed signal to provide the sliced signal, the applying the non-linear distortion function to the sliced signal to provide the second signal, and the generating the estimate of the non-linear distortion component of the first reconstructed signal based on the second signal, the reconstruction of the at least part of the non-linear distortion, and the scaled sliced signal.

11. The method of claim 10, wherein the iterative process comprises a Bussgang decomposition algorithm.

12. The method of claim 10, wherein the iterative process further comprises:
    scaling the second reconstructed signal to provide a scaled corrected signal;
    slicing the scaled corrected signal to provide a second sliced signal;
    scaling the second sliced signal to provide a second scaled sliced signal;
    applying the non-linear distortion function to the second sliced signal to provide a third signal;
    generating a second estimate of a non-linear distortion component of the second reconstructed signal based on the third signal, the reconstruction of the at least part of the non-linear distortion, and the second scaled sliced signal; and
    generating a third reconstructed signal based on the second estimate of the non-linear distortion component.

13. The method of claim 10, wherein the performing the iterative process comprises:
    performing iterations of the iterative process a defined number of times.

14. The method of claim 10, wherein the performing the iterative process comprises:
    ceasing the iterative process when an error associated with the slicing is below a threshold error level.

15. The method of claim 1, wherein the indication indicates at least one amplitude and at least one position within the data signal for at least one clipped peak.

16. The method of claim 1, wherein the combining the data signal and the reconstruction of the at least part of the non-linear distortion comprises:
    replacing at least one sample of the data signal with the reconstruction of the at least part of the non-linear distortion.

17. The method of claim 1, wherein the generating the estimate of the non-linear distortion component of the first reconstructed signal comprises:
    adding the reconstruction of the at least part of the non-linear distortion to the second signal to provide a third signal; and
    subtracting the scaled sliced signal from the third signal.

18. A first wireless communication device, comprising:
    a transceiver;
    a memory; and
    a processor communicatively coupled to the transceiver and the memory, wherein the processor and the memory are configured to:
      receive a data signal from a second wireless communication device via the transceiver, wherein the data signal is based on a first signal and comprises a non-linear distortion;
      receive an indication of at least part of the non-linear distortion from the second wireless communication device via the transceiver;
      generate a reconstruction of the at least part of the non-linear distortion based on the indication;
      combine the data signal and the reconstruction of the at least part of the non-linear distortion to provide a first reconstructed signal;
      scale the first reconstructed signal to provide a scaled reconstructed signal;

slice the scaled reconstructed signal to provide a sliced signal;
scale the sliced signal to provide a scaled sliced signal;
apply a non-linear distortion function to the sliced signal to provide a second signal;
generate an estimate of a non-linear distortion component of the first reconstructed signal based on the second signal, the reconstruction of the at least part of the non-linear distortion, and the scaled sliced signal; and
generate a second reconstructed signal based on the estimate of the non-linear distortion component.

19. The first wireless communication device of claim 18, wherein the scaling comprises Bussgang scaling that uses a Bussgang coefficient.

20. The first wireless communication device of claim 19, wherein:
the non-linear distortion is due to clipping of the first signal;
the indication indicates at least a part of the clipping of the first signal; and
the applying the non-linear distortion function to the sliced signal comprises clipping the sliced signal.

21. The first wireless communication device of claim 18, wherein the processor and the memory are further configured to:
apply a threshold to the sliced signal.

22. The first wireless communication device of claim 18, wherein the processor and the memory are further configured to:
receive from the second wireless communication device a set of parameters indicative of the non-linear distortion function, wherein the set of parameters comprises a clipping threshold.

23. The first wireless communication device of claim 18, wherein the processor and the memory are further configured to:
perform an iterative process that includes the slicing the scaled reconstructed signal to provide the sliced signal, the applying the non-linear distortion function to the sliced signal to provide the second signal, and the generating the estimate of the non-linear distortion component of the first reconstructed signal based on the second signal, the reconstruction of the at least part of the non-linear distortion, and the scaled sliced signal.

24. The first wireless communication device of claim 23, wherein the iterative process comprises a Bussgang decomposition algorithm.

25. The first wireless communication device of claim 23, wherein the processor and the memory are further configured to:
scale the second reconstructed signal to provide a scaled corrected signal;
slice the scaled corrected signal to provide a second sliced signal;
scale the second sliced signal to provide a second scaled sliced signal;
apply the non-linear distortion function to the second sliced signal to provide a third signal;
generate a second estimate of a non-linear distortion component of the second reconstructed signal based on the third signal, the reconstruction of the at least part of the non-linear distortion, and the second scaled sliced signal; and
generate a third reconstructed signal based on the second estimate of the non-linear distortion component.

26. The first wireless communication device of claim 23, wherein the processor and the memory are further configured to:
perform iterations of the iterative process a defined number of times.

27. The first wireless communication device of claim 23, wherein the processor and the memory are further configured to:
cease the iterative process when an error associated with the slicing is below a threshold error level.

28. The first wireless communication device of claim 18, wherein:
the indication indicates at least one amplitude and at least one position within the clipped data signal for at least one clipped peak.

29. A first wireless communication device, comprising:
means for receiving a data signal from a second wireless communication device, wherein the data signal is based on a first signal and comprises a non-linear distortion;
means for receiving an indication of at least part of the non-linear distortion from the second wireless communication device;
means for generating a reconstruction of the at least part of the non-linear distortion based on the indication;
means for combining the data signal and the reconstruction of the at least part of the non-linear distortion to provide a first reconstructed signal;
means for scaling the first reconstructed signal to provide a scaled reconstructed signal;
means for slicing the scaled reconstructed signal to provide a sliced signal;
means for scaling the sliced signal to provide a scaled sliced signal;
means for applying a non-linear distortion function to the sliced signal to provide a second signal;
means for generating an estimate of a non-linear distortion component of the first reconstructed signal based on the second signal, the reconstruction of the at least part of the non-linear distortion, and the scaled sliced signal; and
means for generating a second reconstructed signal based on the estimate of the non-linear distortion component.

30. An article of manufacture for use by a first wireless communication device in a wireless communication network, the article comprising:
a non-transitory computer-readable medium having stored therein instructions executable by one or more processors of the first wireless communication device to:
receive a data signal from a second wireless communication device, wherein the data signal is based on a first signal and comprises a non-linear distortion;
receive an indication of at least part of the non-linear distortion from the second wireless communication device;
generate a reconstruction of the at least part of the non-linear distortion based on the indication;
combine the data signal and the reconstruction of the at least part of the non-linear distortion to provide a first reconstructed signal;
scale the first reconstructed signal to provide a scaled reconstructed signal;
slice the scaled reconstructed signal to provide a sliced signal;
scale the sliced signal to provide a scaled sliced signal;
apply a non-linear distortion function to the sliced signal to provide a second signal;

generate an estimate of a non-linear distortion component of the first reconstructed signal based on the second signal, the reconstruction of the at least part of the non-linear distortion, and the scaled sliced signal; and
generate a second reconstructed signal based on the estimate of the non-linear distortion component.

* * * * *